(12) United States Patent
Kim et al.

(10) Patent No.: US 10,761,498 B2
(45) Date of Patent: Sep. 1, 2020

(54) ELECTRONIC DEVICE AND METHOD FOR OPERATING THE SAME

(71) Applicant: Samsung Electronics Co., Ltd., Gyeonggi-do (KR)

(72) Inventors: Sang-Ju Kim, Gyeonggi-do (KR); Jae-Deok Cha, Gyeonggi-do (KR); Won-Seok Jang, Gyeonggi-do (KR); In-Sung Hwang, Seoul (KR)

(73) Assignee: Samsung Electronics Co., Ltd (KR)

( * ) Notice: Subject to any disclaimer, the term of this patent is extended or adjusted under 35 U.S.C. 154(b) by 238 days.

(21) Appl. No.: 15/682,060

(22) Filed: Aug. 21, 2017

(65) Prior Publication Data

US 2018/0052432 A1 Feb. 22, 2018

(30) Foreign Application Priority Data

Aug. 19, 2016 (KR) .................. 10-2016-0105697

(51) Int. Cl.
*G05B 15/02* (2006.01)
*G06F 1/26* (2006.01)

(52) U.S. Cl.
CPC .......... *G05B 15/02* (2013.01); *G06F 1/263* (2013.01)

(58) Field of Classification Search
CPC ................. G05B 15/02; G06F 1/263
See application file for complete search history.

(56) References Cited

U.S. PATENT DOCUMENTS

| | | | | |
|---|---|---|---|---|
| 4,405,867 A * | 9/1983 | Moakler | ................... | H02J 9/06 307/64 |
| 5,600,841 A | 2/1997 | Culbert | | |
| 5,894,414 A * | 4/1999 | Jiang | ................... | H02M 1/4216 363/65 |
| 5,939,799 A * | 8/1999 | Weinstein | ................. | H02J 1/10 307/45 |
| 6,452,362 B1 * | 9/2002 | Choo | .................... | H02J 7/0013 320/116 |
| 6,744,151 B2 | 6/2004 | Jackson et al. | | |

(Continued)

FOREIGN PATENT DOCUMENTS

KR  100451163  10/2004

OTHER PUBLICATIONS

NKK switches,"Fundamentals of Switches:Series 1," pp. 1-8, Mar. 24, 2016 (Year: 2016).*

*Primary Examiner* — Pinping Sun
(74) *Attorney, Agent, or Firm* — The Farrell Law Firm, P.C.

(57) ABSTRACT

An electronic device is provided which includes a power input unit including a first power input unit and a second power input unit, a switching unit including a first switching circuit connected with the first power input unit and a second switching circuit connected with the second power input unit, and a controller configured to receive selection information for selecting a power source to supply power to a load unit included in the electronic device of a first power source and a second power source, wherein the first power source and the second power source are connected with the first power input unit and the second power input unit, respectively, and control the switching unit to connect the first power source to the load unit according to the selection information.

17 Claims, 18 Drawing Sheets

(56) References Cited

U.S. PATENT DOCUMENTS

| | | | | |
|---|---|---|---|---|
| 7,330,987 B2* | 2/2008 | Morisawa | H04L 67/12 | 713/321 |
| 8,220,572 B2* | 7/2012 | Donnelly | B60L 15/2045 | 180/65.265 |
| 8,335,940 B2* | 12/2012 | Umezu | G06F 1/263 | 713/340 |
| 8,848,362 B1* | 9/2014 | Che | G05B 9/02 | 361/679.46 |
| 9,148,001 B1* | 9/2015 | Mohanty | G06F 1/263 | |
| 9,314,639 B2* | 4/2016 | Rao | A61N 1/37247 | |
| 9,729,145 B2* | 8/2017 | Sbuell | H03K 17/693 | |
| 9,843,227 B2* | 12/2017 | Noguchi | H02J 1/102 | |
| 2006/0061921 A1* | 3/2006 | Chen | G06F 1/263 | 361/18 |
| 2006/0232133 A1* | 10/2006 | Cha | H02J 9/062 | 307/23 |
| 2008/0111424 A1* | 5/2008 | Yeh | H02J 1/10 | 307/65 |
| 2009/0037754 A1* | 2/2009 | Cha | G06F 1/206 | 713/322 |
| 2010/0130263 A1* | 5/2010 | Zhang | H04B 1/3883 | 455/572 |
| 2010/0225169 A1* | 9/2010 | Hanawa | H03K 17/302 | 307/43 |
| 2013/0082643 A1* | 4/2013 | Cha | H02J 7/0077 | 320/107 |
| 2013/0272691 A1* | 10/2013 | Yamaguchi | G03B 7/26 | 396/301 |
| 2015/0123480 A1* | 5/2015 | Xu | H02J 7/0068 | 307/66 |
| 2015/0318698 A1* | 11/2015 | Tani | H02J 3/46 | 700/287 |
| 2016/0179179 A1* | 6/2016 | An | G06F 1/3265 | 345/212 |
| 2016/0211700 A1* | 7/2016 | Zhang | H02J 9/06 | |
| 2016/0308372 A1* | 10/2016 | Kolla | H02J 4/00 | |
| 2017/0031401 A1* | 2/2017 | Chang | G06F 1/263 | |
| 2018/0013318 A1* | 1/2018 | Nguyen | H02J 7/0024 | |

* cited by examiner

| SEL1 | SEL2 | POWER SOURCE | OPERATION |
|---|---|---|---|
| 0 | 0 | FIRST OR SECOND POWER SOURCE | LAST ONE HAS PRIORITY |
| 0 | 1 | FIRST POWER SOURCE | FIRST POWER SOURCE HAS PRIORITY |
| 1 | 0 | SECOND POWER SOURCE | SECOND POWER SOURCE HAS PRIORITY |
| 1 | 1 | FIRST OR SECOND POWER SOURCE | FIRST ONE HAS PRIORITY |

FIG.9

| CTRL | POWER SOURCE |
|---|---|
| 1 | FIRST POWER SOURCE |
| 0 | SECOND POWER SOURCE |

FIG.10A

| CTRL1 | CTRL2 | POWER SOURCE |
|---|---|---|
| 0 | 0 | FIRST POWER SOURCE |
| 0 | 1 | SECOND POWER SOURCE |
| 1 | 0 | THIRD POWER SOURCE |
| 1 | 1 | FOURTH POWER SOURCE |

FIG.10B

| SEL | POWER SOURCE |
|---|---|
| 1 | FIRST POWER SOURCE |
| 0 | SECOND POWER SOURCE |

| CTRL | POWER SOURCE |
|---|---|
| 1 | FIRST POWER SOURCE |
| 0 | SECOND POWER SOURCE |

ELECTRONIC DEVICE AND METHOD FOR OPERATING THE SAME

PRIORITY

This application claims priority under 35 U.S.C. § 119(a) to Korean Patent Application Serial No. 10-2016-0105697, which was filed in the Korean Intellectual Property Office on Aug. 19, 2016, the entire disclosure of which is incorporated herein by reference.

BACKGROUND

1. Field of the Disclosure

The present disclosure generally relates to an electronic device, and more particularly, to an electronic device capable of receiving power from multiple power sources or supplying power through multiple power sources, and to a method of operating the same.

2. Description of the Related Art

Electronic devices may receive power from various power sources. For example, electronic devices may receive power through wireless power technology, alternating current (AC) adapters, and/or universal serial bus (USB) ports.

Conventional electronic devices may be cut off from the supply of power when power sources are changed. Since electronic devices may not choose any one of various power sources provided, the electronic devices may not choose high-voltage power sources although provided with low-voltage power sources. Users may not be aware of which of the various power sources electronic devices are currently receiving power from.

SUMMARY

According to an aspect of the present disclosure, an electronic device is provided that receives power from a plurality of power sources, selects from any one of the plurality of power sources, and changes the selected power source to another power source without cutting off the supply of power.

According to another aspect of the present disclosure, an electronic device is provided that supplies power through a plurality of power sources included in the electronic device, selects from any one of the plurality of power sources, and changes the selected power source to another power source without cutting off the supply of power.

In accordance with an aspect of the present disclosure, an electronic device is provided which includes a power input unit including a first power input unit and a second power input unit, a switching unit including a first switching circuit connected with the first power input unit and a second switching circuit connected with the second power input unit, and a controller configured to receive selection information for selecting a power source to supply power to a load unit included in the electronic device of a first power source and a second power source, wherein the first power source and the second power source are connected with the first power input unit and the second power input unit, respectively, and control the switching unit to connect the first power source to the load unit according to the selection information.

In accordance with another aspect of the present disclosure, a method for operating an electronic device is provided which includes sensing a connection of a first power source and a second power source to a first power input unit and a second power input unit, respectively, receiving selection information for selecting a power source to supply power to a load unit included in the electronic device from the first power source and the second power source, and controlling a switching unit to connect the first power source to the load unit according to the selection information.

According to an embodiment of the present disclosure, an electronic device is provided which includes an output unit connected with an external device, a power unit including a first power source and a second power source, a switching unit including a first switching circuit connected with the first power input unit and a second switching circuit connected with the second power input unit, and a controller configured to receive selection information for selecting a power source to supply power to the external device from the first power source and the second power source and control the switching unit to connect the first power source to the external device through the output unit according to the selection information.

BRIEF DESCRIPTION OF THE DRAWINGS

The above and other aspects, features, and advantages of the present disclosure will become more apparent from the following detailed description when taken in conjunction with the accompanying drawings, wherein:

FIG. 9 is a table illustrating selection information of an electronic device receiving power, according to an embodiment of the present disclosure;

FIGS. 10A and 10B are tables illustrating control signals of an electronic device receiving power, according to an embodiment of the present disclosure;

DETAILED DESCRIPTION

Figure 1:
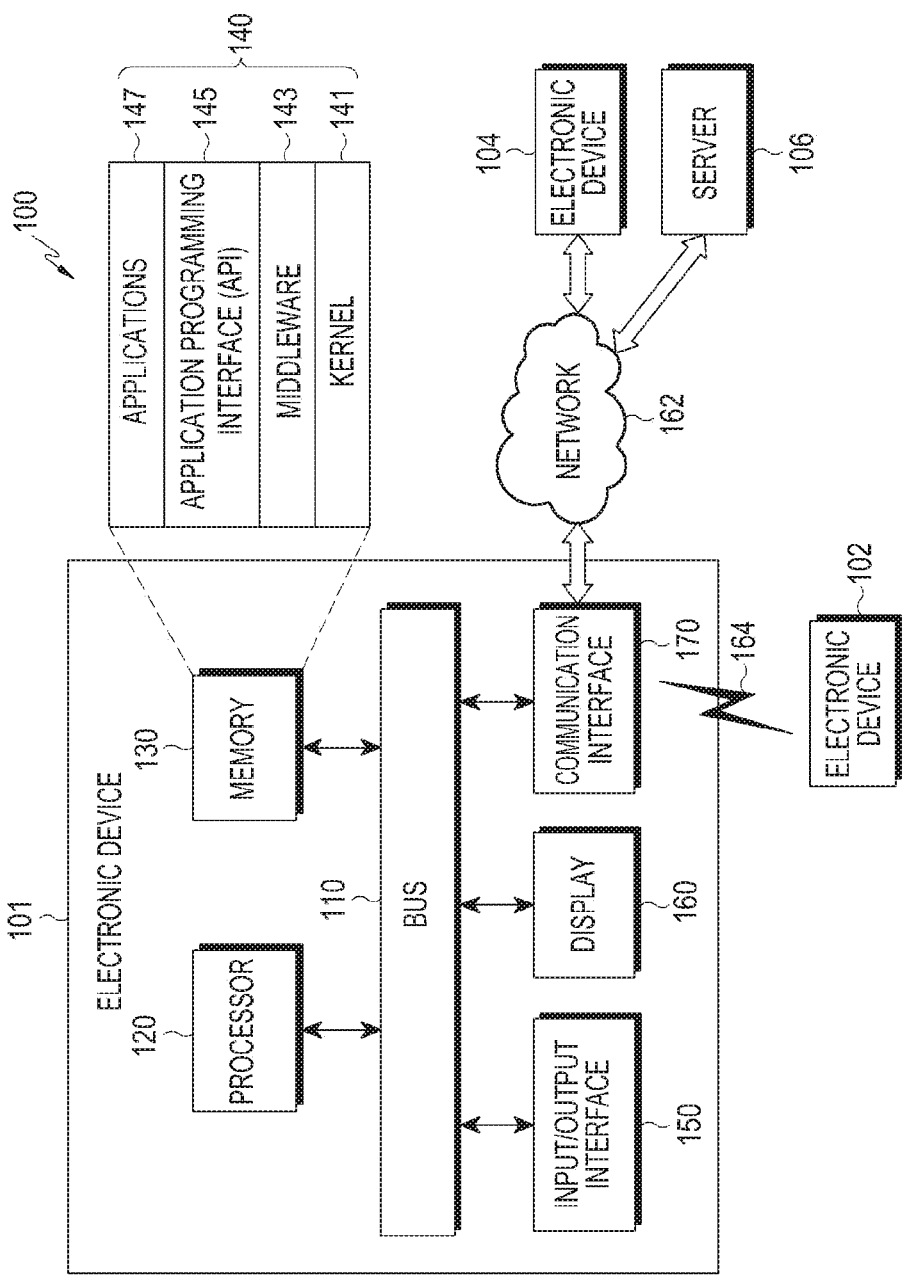
FIG. 1 is a block diagram of an electronic device in a communication network, according to an embodiment of the present disclosure.

Hereinafter, certain embodiments of the present disclosure are described with reference to the accompanying drawings. However, it should be appreciated that the present disclosure is not limited to the embodiments and the terminology used herein, and all changes and/or equivalents are also within the scope of the present disclosure. The same or similar reference numerals may be used to refer to the same or similar elements throughout the specification and the drawings. It is to be understood that the singular forms "a," "an," and "the" also include plural references unless the context clearly indicates otherwise. As used herein, the terms "A or B" or "at least one of A and/or B" may include all possible combinations of A and B. As used herein, the terms "first" and "second" may modify various components regardless of importance and/or order and are used to distinguish a component from another component without limiting the components. It will be understood that when an element (e.g., a first element) is referred to as being (operatively or communicatively) "coupled with/to," or "connected with/to" another element (e.g., a second element), it may be coupled or connected with/to the other element directly or via a third element.

As used herein, the term "configured to" may be interchangeably used with other terms, such as "suitable for," "capable of," "modified to," "made to," "adapted to," "able to," or "designed to" in hardware or software. The term "configured to" may mean that a device may perform an operation together with another device or parts. The term "processor configured (or set) to perform A, B, and C" may mean a general-purpose processor (e.g., a CPU or application processor) that may perform the operations by executing one or more software programs stored in a memory device or a dedicated processor (e.g., an embedded processor) for performing the operations.

The electronic device according to an embodiment of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may be an accessory-type device (e.g., a watch, a ring, a bracelet, an anklet, a necklace, glasses, contact lenses, or a head-mounted device (HMD)), a fabric or clothes integrated device (e.g., electronic clothes), a body attaching-type device (e.g., a skin pad or tattoo), or a body implantable device. The electronic device may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, drones, automatic teller machines (ATMs), point of sales (POS) devices, or Internet of things (IoT) devices (e.g., a light bulb, various sensors, a sprinkler, a fire alarm, a thermostat, a street light, a toaster, fitness equipment, a hot water tank, a heater, or a boiler).

The electronic device may at least one of part of a piece of furniture, building/structure or vehicle, an electronic board, an electronic signature receiving device, a projector, or various measurement devices (e.g., devices for measuring water, electricity, gas, or electromagnetic waves). The electronic device may be flexible or may be a combination of two or more of the above described electronic devices. The electronic device is not limited to the above-listed embodiments. As used herein, the term "user" may denote a human or another device (e.g., an artificial intelligence electronic device) using the electronic device.

FIG. 1 is a block diagram of an electronic device in a communication network, according to an embodiment of the present disclosure.

Referring to FIG. 1, according to an embodiment of the present disclosure, an electronic device 101 is included in a network environment 100. The electronic device 101 includes a bus 110, a processor 120, a memory 130, an input/output interface 150, a display 160, and a communication interface 170. The electronic device 101 may exclude at least one of the components or may add another component. The bus 110 may include a circuit for connecting the components 110 to 170 with one another and transferring communications (e.g., control messages or data) between the components. The processing module 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. The memory 130 may store commands or data related to at least one other component of the electronic device 101. According to an embodiment of the present disclosure, the memory 130 may store software and/or a program 140. The program 140 includes a kernel 141, middleware 143, an application programming interface (API) 145, and/or applications 147. At least a portion of the kernel 141, middleware 143, or API 145 may be denoted an operating system (OS). The kernel 141 may control or manage system resources (e.g., the bus 110, processor 120, or a memory 130) used to perform operations or functions implemented in other programs (e.g., the middleware 143, API 145, or applications 147). The kernel 141 may provide an interface that allows the middleware 143, the API 145, or the applications 147 to access the individual components of the electronic device 101 to control or manage the system resources.

The middleware 143 may function as a relay to allow the API 145 or the applications 147 to communicate data with the kernel 141, for example. Further, the middleware 143 may process one or more task requests received from the applications 147 in order of priority. The middleware 143 may assign a priority of using system resources (e.g., bus 110, processor 120, or memory 130) of the electronic device 101 to at least one of the applications 147 and process one or more task requests. The API 145 is an interface allowing the applications 147 to control functions provided from the kernel 141 or the middleware 143. The API 133 may include at least one interface or function (e.g., a command) for filing control, window control, image processing or text control.

The input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various content (e.g., text, images, videos, icons, or symbols) to the user. The display 160 may include a touchscreen and may receive, e.g., a touch, gesture, proximity or hovering input using an electronic pen or a body portion of the user. The communication interface 170 may set up communication between the electronic device 101 and a first electronic device 102, a second electronic device 104, or a server 106. The communication interface 170 may be connected with the network 162 through wireless or wired communication to communicate with the external electronic device.

The wireless communication may include cellular communication which uses at least one of, e.g., long term evolution (LTE), long term evolution advanced (LTE-A), code division multiple access (CDMA), wideband code division multiple access (WCDMA), universal mobile telecommunication system (UMTS), wireless broadband (Wi-Bro), or global system for mobile communication (GSM). According to an embodiment of the present disclosure, the wireless communication may include at least one of, e.g., wireless fidelity (Wi-Fi), Bluetooth™, Bluetooth™ low power (BLE), Zigbee™, near field communication (NFC), magnetic secure transmission (MST), radio frequency, or body area network (BAN). The wireless communication may include global navigation satellite system (GNSS). The GNSS may be, e.g., global positioning system (GPS), global navigation satellite system (Glonass), Beidou navigation satellite system (Beidou) or Galileo, or the European global satellite-based navigation system. Hereinafter, the terms "GPS" and "GNSS" may be interchangeably used. The wired connection may include at least one of, e.g., USB, high definition multimedia interface (HDMI), recommended standard (RS)-232, power line communication (PLC) or plain old telephone service (POTS). The network 162 may include at least one of telecommunication networks, e.g., a computer network (e.g., local area network (LAN) or wide area network (WAN)), the Internet, or a telephone network.

The first and second external electronic devices 102 and 104 each may be a device of the same or a different type from the electronic device 101. According to an embodiment of the present disclosure, all or some of operations executed on the electronic device 101 may be executed on the electronic devices 102 and 104 or server 106. When the electronic device 101 performs some function or service automatically or at a request, the electronic device 101, instead of executing the function or service on its own or additionally, may request electronic device 102, 104 or server 106 to perform at least some functions associated therewith. The electronic device 102, 104 or server 106 may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
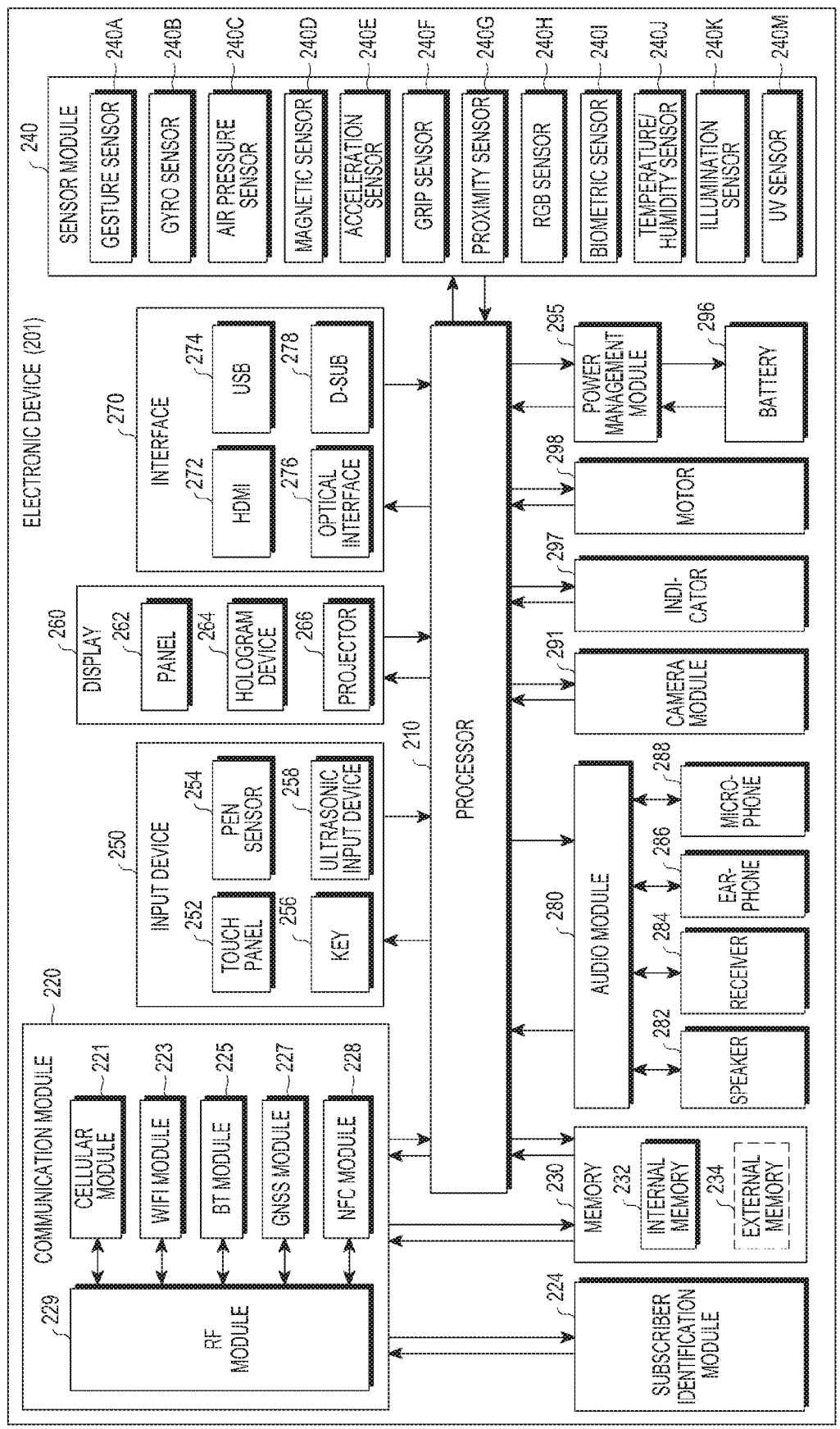
FIG. 2 is a block diagram of an electronic device, according to an embodiment of the present disclosure.

FIG. 2 is a block diagram of an electronic device, according to an embodiment of the present disclosure.

FIG. 2 is a block diagram illustrating an electronic device 201 according to an embodiment of the present disclosure. The electronic device 201 may include the whole or part of the configuration of, e.g., the electronic device 101 shown in FIG. 1. The electronic device 201 includes one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an operating system or application programs, and the processor 210 may process and compute various data. The processor 210 may be implemented in, e.g., a system on chip (SoC). The processor 210 may further include a graphic processing unit (GPU) and/or an image signal processor. The processor 210 may include at least some (e.g., a cellular module 221) of the components shown in FIG. 2. The processor 210 may load a command or data received from at least one of other components (e.g., a non-volatile memory) in a volatile memory, process the command or data, and store resultant data in the non-volatile memory.

The communication module 220 may have the same or similar configuration to the communication interface 170 of FIG. 1. The communication module 220 includes, e.g., a cellular module 221, a wireless fidelity (Wi-Fi) module 223, a Bluetooth™ (BT) module 225, a GNSS module 227, an NFC module 228, and a RF module 229. The cellular module 221 may provide voice call, video call, messaging services, or Internet services through, e.g., a communication network. The cellular module 221 may perform identification or authentication of the electronic device 201 in the communication network using a subscriber identification module SIM 224 (e.g., a SIM card). The cellular module 221 may perform at least some of the functions provided by the processor 210. The cellular module 221 may include a CP. At least some (e.g., two or more) of the cellular module 221, the Wi-Fi module 223, the Bluetooth™ module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), or an antenna. At least one of the cellular module 221, the Wi-Fi module 223, the Bluetooth™ module 225, the GNSS module 227, or the NFC module 228 may communicate RF signals through a separate RF module.

The SIM 224 may include, e.g., a card including a subscriber identification module or an embedded SIM, and may contain unique identification information (e.g., an integrated circuit card identifier (ICCID) or subscriber information (e.g., an international mobile subscriber identity (IMSI)).

The memory 230 includes, e.g., an internal memory 232 or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid-state drive (SSD). The external memory 234 may include a flash drive, e.g., a compact flash (CF) memory, a secure digital (SD) memory, a micro-SD memory, a mini-SD memory, an extreme digital (xD) memory, a multi-media card (MMC), or a memory stick. The external memory 234 may be functionally or physically connected with the electronic device 201 via various interfaces.

The sensor module 240 may measure a physical quantity or detect an operational state of the electronic device 201, and the sensor module 240 may convert the measured or detected information into an electrical signal. The sensor module 240 includes at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB)) sensor, a bio sensor 240I, a temperature/humidity sensor 240J, an illumination sensor 240K, or an ultra violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. The electronic device 201 may further include a processor configured to control the sensor module 240 as part of the processor 210 or separately from the processor 210, and the electronic device 1601 may control the sensor module 240 while the processor 210 is in a sleep mode.

The input unit 250 includes a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone 288 to identify data corresponding to the sensed ultrasonic wave.

The display 260 includes a panel 262, a hologram device 264, a projector 266, and/or a control circuit for controlling the same. The panel 262 may be flexible, transparent, or wearable. The panel 262, together with the touch panel 252, may be configured in one or more modules. According to an embodiment of the present disclosure, the panel 262 may include a pressure sensor that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface 270 includes e.g., an HDMI 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may convert a sound signal into an electrical signal and vice versa. At least a part of the audio module 280 may be included in e.g., the input/output interface 150 as shown in FIG. 1. The audio module 280 may process sound information input or output through e.g., a speaker 282, a receiver 284, an earphone 286, or the microphone 288. The camera module 291 may be a device for capturing still images and videos, and may include, according to an embodiment of the present disclosure, one or more image sensors (e.g., front and back sensors), a lens, an image signal processor (ISP), or a flash such as an LED or xenon lamp. The power manager module 295 may manage power of the electronic device 201. The power manager module 295 may include a power management integrated circuit (PMIC), a charger IC, or a battery gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, and the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electrical signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or MediaFlo™ standards. Each of the aforementioned components of the electronic device may include one or more parts, and a name of the part may vary with a type of the electronic device. The electronic device 201 may exclude some elements or include more elements, or some of the elements may be combined into a single entity that may perform the same function as by the elements before being combined.

Figure 3:
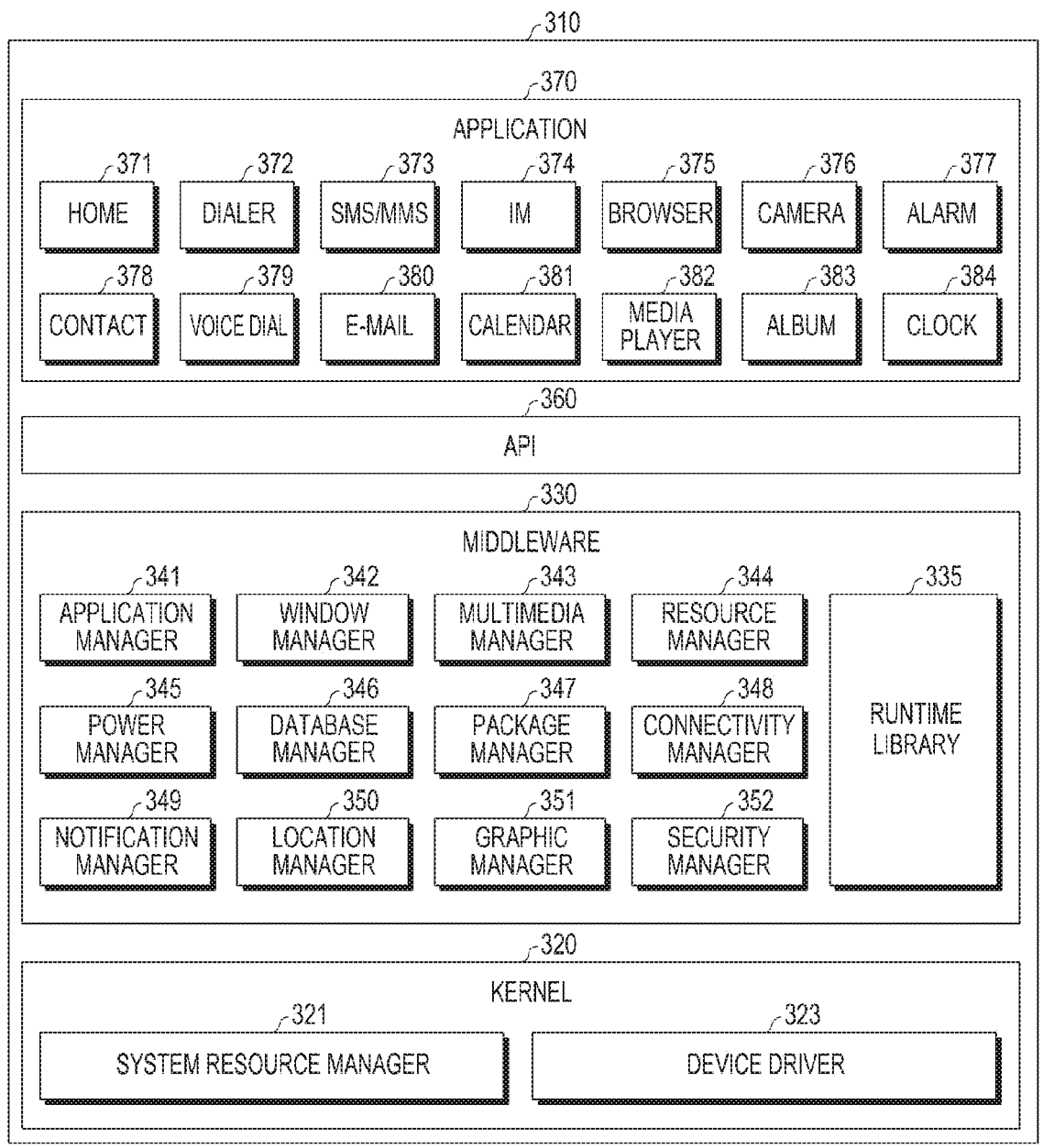
FIG. 3 is a block diagram of a program module, according to an embodiment of the present disclosure.

FIG. 3 is a block diagram of a program module, according to an embodiment of the present disclosure.

Referring to FIG. 3, the program module 310 may include an operating system (OS) controlling resources related to the electronic device 101 and/or various applications 147 driven on the operating system. The operating system may include, e.g., Android™, iOS™, Windows™, Symbian™, Tizen™, or Bada™. The program module 310 includes a kernel 320, middleware 330, an API 360, and/or an application 370. At least a part of the program module 310 may be preloaded on the electronic device or may be downloaded from the electronic devices 102 and 104 or server 106.

The kernel 320 includes a system resource manager 321 or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a Bluetooth™ driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by application 370. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341 may manage the life cycle of, e.g., the application 370. The window manager 342 may manage GUI resources used on the screen. The multimedia manager 343 may determine formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. The power manager 345 may interwork with a basic input/output system (BIOS). The database manager 346 may generate, search, or vary a database to be used in the application 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., location information on the electronic device. The graphic manager 351 may manage, e.g., graphic effects to be provided to the user and their related user interface. The security manager 352 may provide system security or user authentication, for example. According to an embodiment of the present disclosure, the middleware 330 may include a telephony manager for managing the voice or video call function of the electronic device or a middleware module able to form a combination of the functions of the above-described elements. The middleware 330 may provide a module specified according to the type of the operating system. The middleware 330 may dynamically omit some existing components or add new components. The API 360 may be a set of, e.g., API programming functions and may have different configurations depending on operating systems. For example, in the case of Android™ or iOS™, one API set may be provided per platform, and in the case of Tizen™, two or more API sets may be offered per platform.

The application 370 includes an application that may provide, e.g., a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar level), or environmental information (e.g., air pressure, moisture, or temperature information). According to an embodiment of the present disclosure, the application 370 may include an information exchange application supporting information exchange between the electronic device and an external electronic device. Examples of the information exchange application may include, but are not limited to, a notification relay application for transferring specific information to the external electronic device, or a device management application for managing the external electronic device. The notification relay application may transfer notification information generated by other application of the electronic device to the external electronic device or receive notification information from the external electronic device and provide the received notification information to the user. The device management application may install, delete, or update a function (e.g., turn-on/turn-off the external electronic device (or some elements) or adjusting the brightness (or resolution) of the display) of the external electronic device communicating with the electronic device or an application operating on the external electronic device. The application 370 may include an application (e.g., a health-care application of a mobile medical device) designated according to an attribute of the external electronic device. The application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

As used herein, the term "module" includes a unit configured in hardware, software, or firmware and may be interchangeably used with other terms, e.g., a logic, logic block, part, or circuit. The module may be a single integral part or a minimum unit or part of for performing one or more functions. The module may be implemented mechanically or electronically and may include, e.g., an application-specific integrated circuit (ASIC) chip, field-programmable gate arrays (FPGAs), or programmable logic device, that has been known or to be developed in the future. At least a part of the device (e.g., modules or their functions) or method (e.g., operations) may be implemented as instructions stored in a computer-readable storage medium (e.g., the memory 130), e.g., in the form of a program module. The instructions, when executed by the processor 120, may enable the processor to carry out a corresponding function. The computer-readable medium may include, e.g., a hard disk, a floppy disc, a magnetic medium (e.g., magnetic tape), an optical recording medium (e.g., CD-ROM, DVD, magnetic-optical medium (e.g., floptical disk), or an embedded memory. The instruction may include a code created by a compiler or a code executable by an interpreter. Modules or programming modules may include at least one or more of the aforementioned components, omit some of them, or further include other additional components. Operations performed by modules, programming modules or other components may be carried out sequentially, in parallel, repeatedly or heuristically, or at least some operations may be executed in a different order or omitted or other operations may be added.

Figure 4:
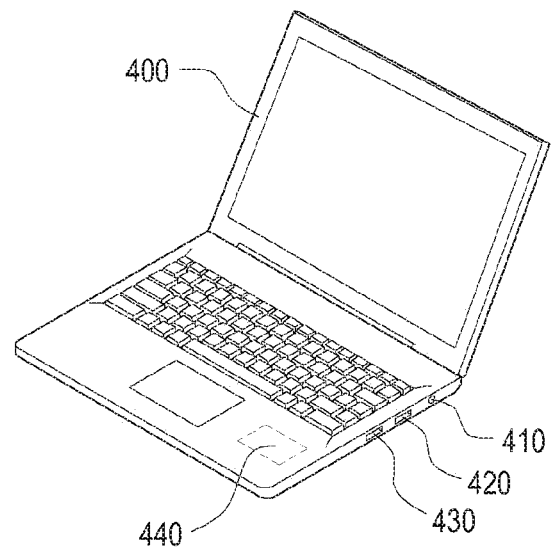
FIG. 4 is a block diagram schematically illustrating an electronic device, according to an embodiment of the present disclosure.

FIG. 4 is a diagram illustrating an electronic device, according to an embodiment of the present disclosure.

Referring to FIG. 4, an electronic device 400 may receive power from the outside. The electronic device 400 may also supply power to the outside.

The electronic device 400 may be substantially the same or similar to the electronic device 201 of FIG. 2 or the electronic device 101 of FIG. 1. The electronic device 400 may be, e.g., a personal computer (PC), a tablet PC, and/or a smartphone.

According to an embodiment of the present disclosure, the electronic device 400 may receive power from a plurality of power sources. The plurality of power sources may be power sources using an alternating current (AC) adapter, USB power delivery, and/or wireless power charging technology.

The electronic device 400 may include power input unit in which the plurality of power sources may be input. The power input unit includes a first power input unit 410 receiving power through an AC adapter, a second power input unit 420 receiving power through the USB, and a third power input unit 440 wirelessly receiving power.

The electronic device 400 may supply power to an external device using the plurality of power sources. In this case, the plurality of power sources may be included in the electronic device 400. The plurality of power sources may be power sources using an AC adapter, the USB, and/or wireless power charging technology.

The electronic device 400 may include power output unit in which the plurality of power sources may be output. The power output unit may include a first power output unit 410 outputting power through an AC adapter, a second power output unit 430 outputting power through the USB, and a third power output unit 440 wirelessly outputting power.

The power input unit and the power output unit are not limited in number or position as those shown in FIG. 4.

Figure 5:
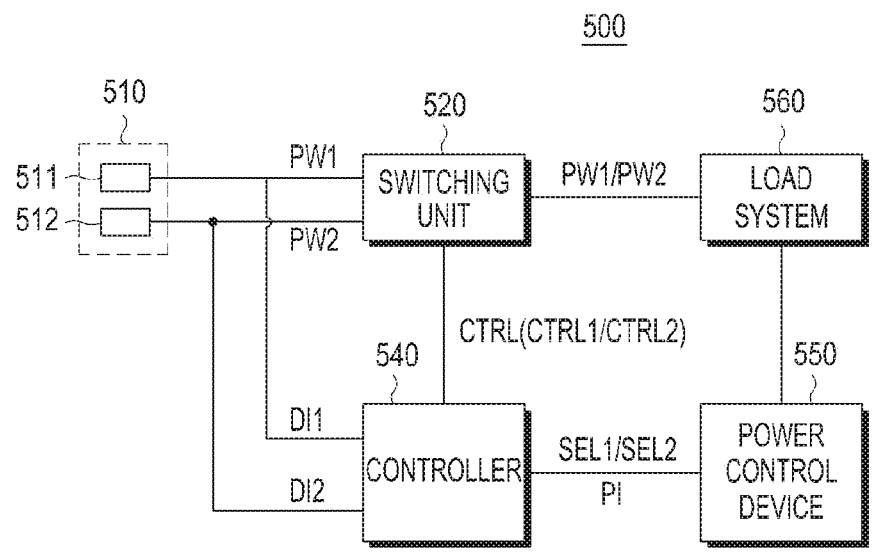
FIG. 5 is a block diagram schematically illustrating an electronic device receiving power, according to an embodiment of the present disclosure.

FIG. 5 is a block diagram schematically illustrating an electronic device receiving power, according to an embodiment of the present disclosure.

Embodiments in which an electronic device receives or supplies power through two power sources are described below merely for description purposes. However, the present disclosure is not limited thereto. The electronic device may also be implemented to receive or supply power through multiple power sources.

Referring to FIG. 5, an electronic device 500 may be substantially the same or similar to the electronic device 400 described above in connection with FIG. 4.

The electronic device 500 includes power input unit 510, a switching unit 520, a controller 540, a power control device 550, and a load system 560.

The power input unit 510 may be connected with a plurality of power sources. The plurality of power sources may be power sources using at least one of an AC adapter, the USB, and wireless power charging technology.

The power input unit 510 includes a first power input unit 511 and a second power input unit 512. The first power input unit 511 may be connected with a first power source, and the second power input unit 511 may be connected with a second power source.

The switching unit 520 may be connected with the power input unit 510. According to an embodiment of the present disclosure, the switching unit 520 may connect the plurality of power sources connected with the power input unit to the load system 560 under control of the controller 540.

The switching unit 520 may include a plurality of switching circuits. For example, a first switching circuit may be connected with the first power input unit 511, and the second switching circuit may be connected with the second power input unit 512.

The switching unit 520 may receive power from the power input unit 510. The switching unit 520 may receive first power PW1 from the first power source through the first power input unit 511 and power PW2 from the second power source through the second power input unit 512.

The switching unit 520 may also transmit the first power PW1 or the second power PW2 to the load system 560 under control of the controller 540.

The controller 540 may control the switching unit 520 by the power control device 550.

The controller 540 may sense connection (or input) of the first power source and second power source to the first power input unit 511 and second power input unit 512 included in the power input unit 510.

According to an embodiment of the present disclosure, when the first power source is connected to the first power input unit 511, the controller 540 may detect the connection of the first power source according to a first voltage variation DI1. When the second power source is connected to the second power input unit 512, the controller 540 may detect the connection of the second power source according to a second voltage variation DI2.

Upon sensing the first power source and the second power source, the controller 540 may receive selection information SEL1 and SEL2 from the power control device 550. The selection information SEL1 and SEL2 may include information for selecting the first power source or the second power source that supplies power to the load system 560.

The controller 540 may control the switching unit 520 to connect any one of the first power source and the second power source to the load system 560 according to the selection information SEL1 and SEL2. The controller 540 may transmit a control signal CTRL to the switching unit 520. In this case, the control signal CTRL may include a signal for controlling the turn-on/off of the switching circuits in the switching unit 520 by the controller 540.

The controller 540 may transmit, to the power control device 550, information PI regarding which one of the first power source and the second power source is connected with the load system 560. The controller 540 may also transmit, to the power control device 550, information PI regarding which one of the first power source and the second power source supplies power to the load system 560.

The power control device 550 may transmit the selection information SEL1 and SEL2 to the controller 540. The power control device 550 may also receive the information PI regarding which power source is connected with the load system 560. In this case, the power control device 550 may provide the user with a notification regarding which power source is connected with the load system 560.

The power control device 550 may include a microprocessor.

The load system 560 may include a system receiving power from the plurality of power sources. The load system 560 may receive power from the first power source and the second power source. The load system 560 may include a plurality of devices that perform various functions.

Figure 6:
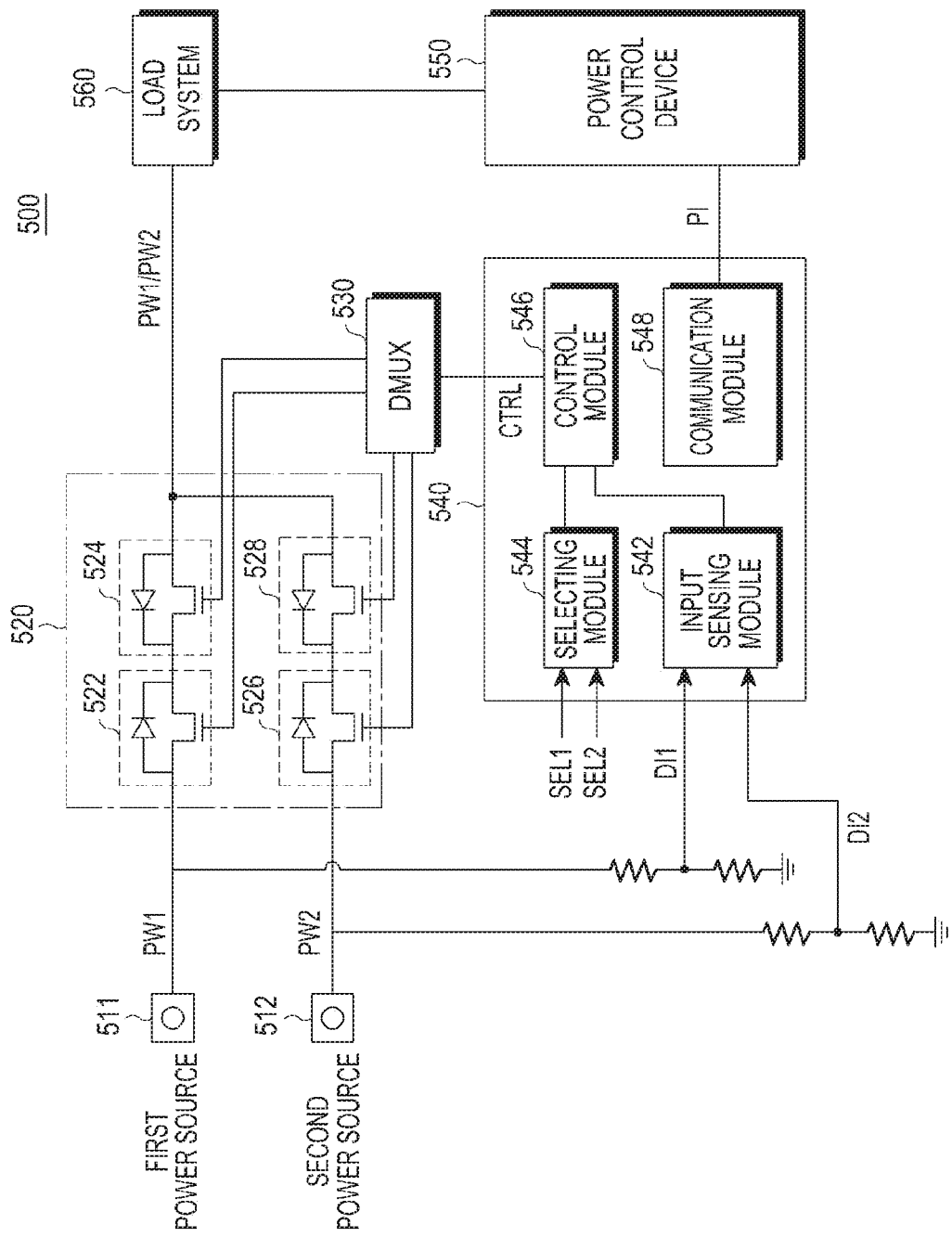
FIG. 6 is a block diagram illustrating a detailed configuration of an electronic device as shown in FIG. 5, according to an embodiment of the present disclosure.

FIG. 6 is a block diagram illustrating a detailed configuration of an electronic device as shown in FIG. 5, according to an embodiment of the present disclosure.

Referring to FIG. 6, the electronic device 500 includes a demultiplexer 530. The demultiplexer 530 may be included in the controller 540.

The demultiplexer 530 may receive the control signal CTRL from the controller 540 and control the switching unit 520 in response to the control signal CTRL. The demultiplexer 530 may output a signal for controlling the switching circuits included in the switching unit 520 in response to the control signal CTRL.

The switching unit 520 may include a first switching circuit and a second switching circuit.

The first switching circuit may include a switching circuit that connects the first power source with the load system 560. The second switching circuit may include a switching circuit that connects the second power source with the load system 560.

The first switching circuit may include a first switching element 522 and a second switching element 524.

The first switching element 522 may be connected to the first power input unit 511. The second switching element 524 may be connected to the load system 560.

The first switching element 522 and the second switching element 524 may include a diode and/or a metal-oxide-semiconductor field-effect transistor (MOSFET). The diodes included in the first switching element 522 and the second switching element 524 may be positioned in opposite directions thereof.

According to an embodiment of the present disclosure, the first switching circuit may control the first switching element 522 and the second switching element 524 so that the first power source supplies the first power PW1 to the load system 560 based on signals output from the demultiplexer 530.

The second switching circuit may include a third switching element 526 and a fourth switching element 528.

The third switching element 526 may be connected to the second power input unit 512. The fourth switching element 528 may be connected to the load system 560.

The third switching element 526 and the fourth switching element 528 may include a diode and/or a MOSFET. The diodes included in the third switching element 526 and the fourth switching element 528 may be positioned in opposite directions thereof.

The diodes included in the first switching element 522 and the third switching element 526 may be positioned in the same direction. The diodes included in the second switching element 524 and the fourth switching element 528 may be positioned in the same direction.

According to an embodiment of the present disclosure, the second switching circuit may control the third switching element 526 and the fourth switching element 528 so that the second power source supplies the second power PW2 to the load system 560 based on signals output from the demultiplexer 530.

According to an embodiment of the present disclosure, the switching unit 520 may continuously change (or switch) the first power source connected with the load system 560 to the second power source without cutting off the first power PW1 supplied to the load system 560 based on the signals output from the demultiplexer 530. In this case, the load system 560 may receive the second power PW2 continuously without cutting off the first power PW1 which is supplied to the load system 560.

The controller 540 includes an input sensing module 542, a selecting module 544, a control module 546, and a communication module 548.

The input sensing module 542 may detect which one of the first power source and the second power source is input to a power input unit 510. When the first power source is input to the first power input unit 511, the input sensing module 542 may determine the input of the first power source according to a first voltage variation DI1. When the second power source is input to the second power input unit 512, the input sensing module 542 may determine the input of the second power source according to a second voltage variation DI2.

The first voltage variation DI1 may be a voltage variation due to a connection between the first power input unit 511 and the first power source, and the second voltage variation DI2 may be a voltage variation due to a connection between the second power input unit 512 and the second power source.

The input sensing module 542 may sense the input of the first power source and the second power source and transmit a result of the sensing to the control module 546.

The selecting module 544 may receive selection information SEL1 and SEL2 from a power control device 550. The selecting module 544 may transmit the received selection information SEL1 and SEL2 to the control module 546.

The control module 546 may control the overall operation of the controller 540.

Upon sensing the input of the first power source and the second power source, the control module 546 may output a control signal CTRL based on the selection information SEL1 and SEL2. The control module 546 may transmit the control signal CTRL to the demultiplexer 530.

The selection information SEL1 and SEL2 and the control signal CTRL are described below in detail with reference to FIGS. 9 and 10A.

FIG. 9 is a table illustrating selection information of an electronic device receiving power, according to an embodiment of the present disclosure.

FIGS. 10A and 10B are tables illustrating control signals of an electronic device receiving power, according to an embodiment of the present disclosure.

Referring to FIG. 9, when a selection information item SEL1 included in the selection information is '0' and a selection information item SEL2 included in the selection information is '1' the selection information indicates that the last input power source, of the first power source and the second power source, is selected. The control module 546 may output a control signal CTRL to select the last input of the first power source and the second power source depending on a result of the sensing by the input sensing module 542.

When the selection information item SEL1 included in the selection information is '1' and the selection information item SEL2 included in the selection information is '1' the selection information indicates that the first input power source, of the first power source and the second power source, is selected. The control module 546 may output a control signal CTRL to select the first input of the first power source and the second power source depending on a result of the sensing by the input sensing module 542.

When the selection information item SEL1 included in the selection information is '0' and the selection information item SEL2 included in the selection information is '1' the selection information indicates the first power source out of the first power source and the second power source is selected. The control module 546 may output a control signal CTRL to select the first power source of the first power source and the second power source.

When the selection information item SEL1 included in the selection information is '1' and the selection information item SEL2 included in the selection information is '0' the selection information indicates the second power source out of the first power source and the second power source is selected. The control module 546 may output a control signal CTRL to select the second power source of the first power source and the second power source.

Referring to FIG. 10A, the control module 546 may output a control signal CTRL corresponding to a '1' to indicate selection of the first power source and the control module 546 may output a control signal CTRL corresponding to a '0' to indicate selection of the second power source.

According to an embodiment of the present disclosure, the control module 546 may transmit the control signal CTRL to the demultiplexer 530.

When the control signal CTRL is a '1' the demultiplexer 530 may output signals to control the first switching circuit (e.g., switch closed) and the second switching circuit (e.g., switch open) so that the first power source is connected with the load system 560. When the control signal CTRL is a '0,' the demultiplexer 530 may output signals to control the first switching circuit (e.g., switch open) and the second switching circuit (e.g., switch closed) so that the second power source is connected with the load system 560.

Alternatively, the electronic device 500 may also include power input unit including a first power input unit, a second power input unit, a third power input unit, and a fourth power input unit.

The first power input unit may be connected with a first power source, the second power input unit may be connected with a second power source, the third power input unit may be connected with a third power source, and the fourth power input unit may be connected with a fourth power source.

The switching unit may include a first switching circuit connected with the first power source, a second switching circuit connected with the second power source, a third switching circuit connected with the third power source, and a fourth switching circuit connected with the fourth power source.

According to an embodiment of the present disclosure, the controller may transmit control signals CTRL1 and CTRL2 to the demultiplexer. In this case, the demultiplexer may output signals to control the first switching circuit, the second switching circuit, the third switching circuit, and the fourth switching circuit in response to the control signals CTRL1 and CTRL2.

When a control signal CTRL1 included in the control signals is a '0' and a control signal CTRL2 included in the control signals is a '0' the demultiplexer may output signals to control the first switching circuit (e.g., switch closed), the second switching circuit, the third switching circuit, and the fourth switching circuit (e.g., switch open) so that the first power source is connected with the load system 560. When the control signal CTRL1 included in the control signals is a '0' and the control signal CTRL2 included in the control signals is a '1' the demultiplexer may output signals to control the second switching circuit (e.g., switch closed), the first switching circuit, the third switching circuit, and the fourth switching circuit (e.g., switch open) so that the second power source is connected with the load system 560. When the control signal CTRL1 included in the control signals is a '1' and the control signal CTRL2 included in the control signals is a '0,' the demultiplexer may output signals to control the third switching circuit (e.g., switch closed), the first switching circuit, the second switching circuit, and the fourth switching circuit (e.g., switch open) so that the third power source is connected with the load system 560. When the control signal CTRL1 included in the control signals is a '1' and the control signal CTRL2 included in the control signals is a '1' the demultiplexer may output signals to control the fourth switching circuit (e.g., switch closed), the first switching circuit, the second switching circuit, and the third switching circuit (e.g., switch open) so that the fourth power source is connected with the load system 560.

The communication module 548 may communicate data with the power control device 550. The communication module 548 may communicate data with the power control device 550 through, e.g., an inter-integrated communication (I2C), general-purpose input/output (GPIO), and/or system management bus (SMBus) interface.

The control module 546 may transmit information about the power source that is currently supplying power to the load system 560 through the communication module 548.

The controller 540 may further include a source indicator that transmits the information PI about the power source currently supplying power to the load system 560. In this case, the source indicator may transmit the information PI about the power source currently supplying power to the load system 560 to the power control device 550.

Figure 7:
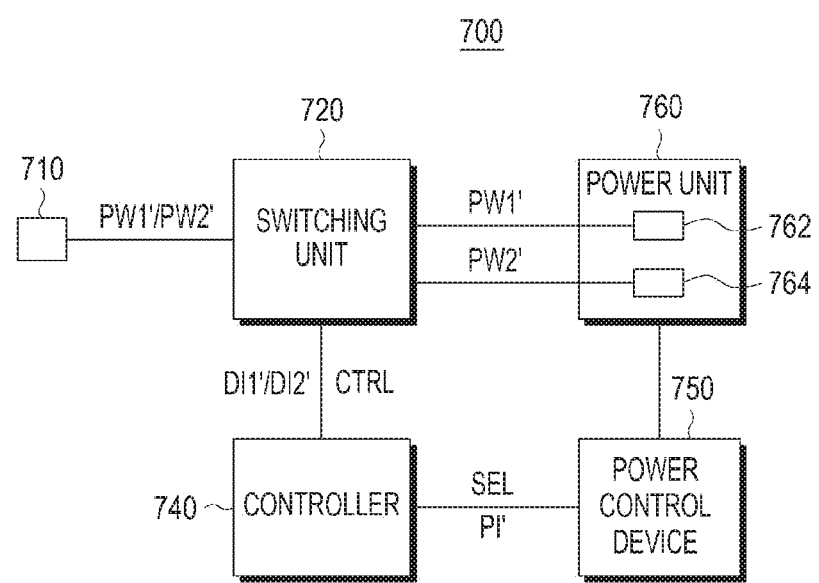
FIG. 7 is a block diagram schematically illustrating an electronic device supplying power, according to an embodiment of the present disclosure.

FIG. 7 is a block diagram schematically illustrating an electronic device supplying power, according to an embodiment of the present disclosure.

Referring to FIG. 7, an electronic device 700 may be substantially the same or similar to the electronic device 400 described above in connection with FIG. 4.

The electronic device 700 includes an output unit 710, a switching unit 720, a controller 740, a power control device 750, and a power unit 760.

The output unit 710 may be connected with an external device. The external device may be a device capable of receiving power from the electronic device 700.

The output unit 710 may be connected with the switching unit 720. The output unit 710 may also be connected with the power unit 760 by way of the switching unit 720. The output unit 710 may be connected with a first power source 762 or a second power source 764 by way of the switching unit 720.

The switching unit 720 may be connected with the output unit 710. According to an embodiment of the present disclosure, the switching unit 720 may connect the external device connected with the output unit to the power unit 760 under control of the controller 740. The switching unit 720 may also be connected with the power unit 760.

The switching unit 720 may include a plurality of switching circuits. For example, a first switching circuit may be connected with the first power source 762, and a second switching circuit may be connected with the second power source 764.

The switching unit 720 may receive power from the power unit 760. The switching unit 720 may transmit first power PW1' output from the first power source 762 to the output unit 710 and second power PW2' output from the second power source to the output unit 710.

The controller 740 may control the switching unit 720 by the power control device 750.

The controller 740 may sense connection of an external device with the output unit 710.

Upon sensing the external device, the controller 740 may receive selection information SEL from the power control device 750. The selection information SEL may be information for selecting the first power source or the second power source that supplies power to the external device.

The controller 740 may control the switching unit 720 to connect any one of the first power source and the second power source to the output unit 710 according to the selection information SEL. The controller 740 may transmit a control signal CTRL to the switching unit 720.

The controller 740 may sense which one of the first power source and the second power source is connected to the output unit 710. The controller 740 may sense the connection between the first power source and the output unit 710 according to a first voltage variation DI1'. The controller 740 may sense the connection between the second power source and the output unit 710 according to a second voltage variation DI2'.

The controller 740 may transmit, to the power control device 750, information PI' regarding which one of the first power source and the second power source is connected with the output system 710. The controller 740 may also transmit, to the power control device 750, the information PI' regarding which one of the first power source and the second power source supplies power to the external device.

The power control device 750 may transmit the selection information SEL to the controller 740. The power control device 750 may also receive the information PI' regarding which power source is connected with the output unit 710. In this case, the power control device 550 may provide the user with a notification regarding which power source is connected with the output unit 710.

The power control device 750 may be a micro-processor.

The power unit 760 may be a device that supplies power to the external device using the first power source and the second power source. The power unit 760 may include a plurality of power sources that output power that corresponds to a plurality of voltages. The plurality of power sources may include at least one of an AC adapter, the USB, and wireless power charging technology.

Figure 8:
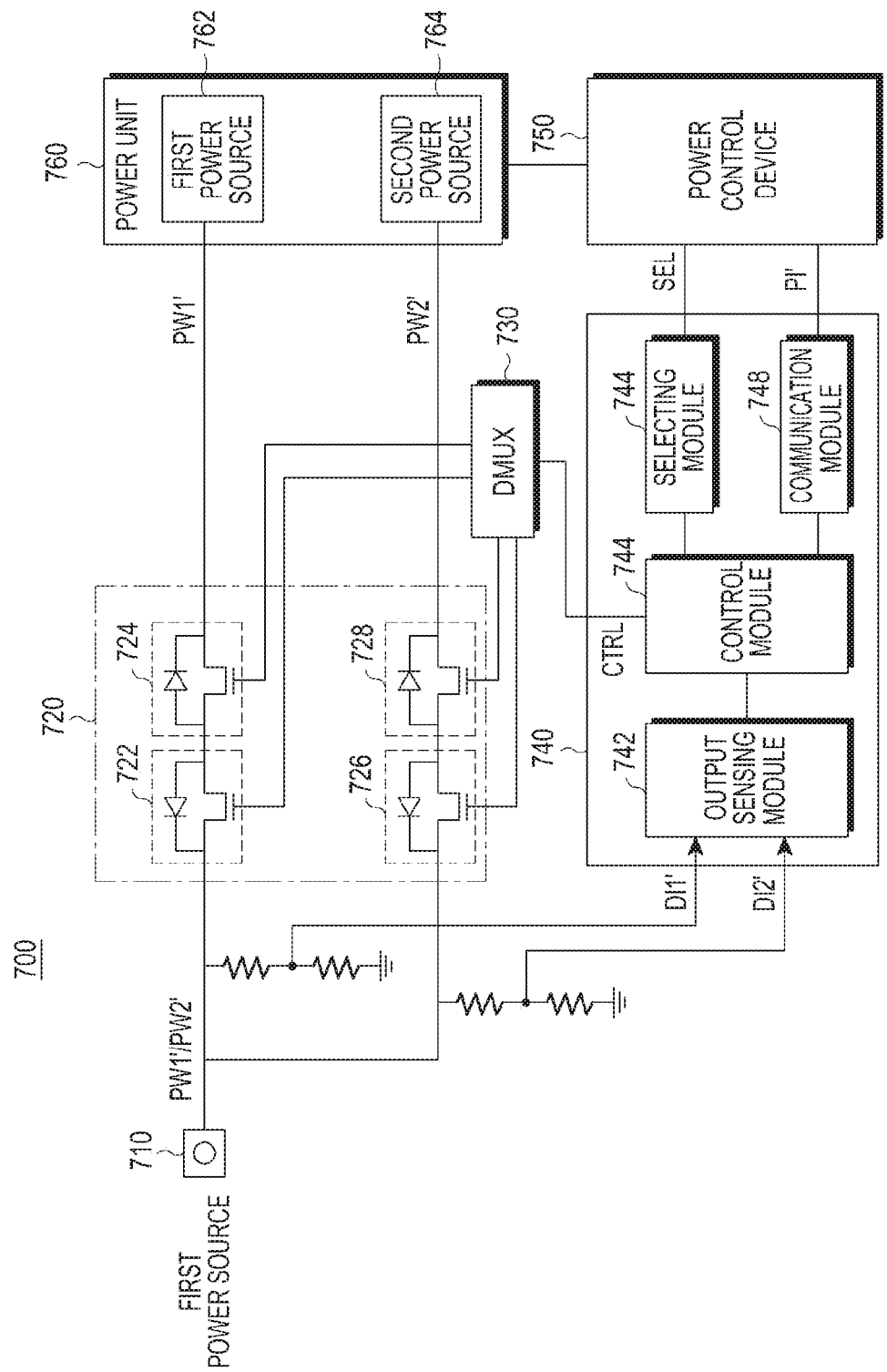
FIG. 8 is a block diagram illustrating a detailed configuration of an electronic device as shown in FIG. 7, according to an embodiment of the present disclosure.

FIG. 8 is a block diagram illustrating a detailed configuration of an electronic device as shown in FIG. 7, according to an embodiment of the present disclosure.

Referring to FIG. 8, the electronic device 700 includes a demultiplexer 730. The demultiplexer 730 may be included in the controller 740.

The demultiplexer 730 may receive the control signal CTRL from the controller 740 and control the switching unit 720 in response to the control signal CTRL. The demultiplexer 730 may output a signal for controlling the switching circuits included in the switching unit 720 in response to the control signal CTRL.

The switching unit 720 may include a first switching circuit and a second switching circuit. The first switching circuit may be a switching circuit that connects the first power source with the output unit 710. The second switching circuit may be a switching circuit that connects the second power source with the output unit 710.

The first switching circuit may include a first switching element 722 and a second switching element 724.

The first switching element 722 may be connected to the output unit 710. The second switching element 724 may be connected to the first power source 762.

The first switching element 722 and the second switching element 724 may include a diode and/or a MOSFET. The diodes included in the first switching element 722 and the second switching element 724 may be positioned in opposite directions thereof.

According to an embodiment of the present disclosure, the first switching circuit may control the first switching element 722 and the second switching element 724 so that the first power source supplies the first power PW1' to the output unit 710 based on signals output from the demultiplexer 730.

The second switching circuit may include a third switching element 726 and a fourth switching element 728.

The third switching element 726 may be connected to the output unit 710. The fourth switching element 728 may be connected to the second power source 764.

The third switching element 726 and the fourth switching element 728 may be a diode and/or a MOSFET. The diodes included in the third switching element 726 and the fourth switching element 728 may be positioned in opposite directions thereof.

The diodes included in the first switching element 722 and the third switching element 726 may be positioned in the same direction. The diodes included in the second switching element 724 and the fourth switching element 728 may be positioned in the same direction.

According to an embodiment of the present disclosure, the second switching circuit may control the third switching element 726 and the fourth switching element 728 so that the second power source supplies the second power PW2' to the output unit 710 based on signals output from the demultiplexer 730.

According to an embodiment of the present disclosure, the switching unit 720 may continuously change (or switch) the first power source connected with the output unit 710 to the second power source without cutting off the first power PW1' supplied to the output unit 710 based on the signals output from the demultiplexer 730. In this case, the output unit 710 may receive the second power PW2' continuously to the first power PW1' without cutting off the first power PW1' which is supplied to the output unit 710.

The controller 740 includes an output sensing module 742, a selecting module 744, a control module 746, and a communication module 748.

The output sensing module 742 may sense which one of the first power source 762 and the second power source 764 is connected to the output unit 710. When the first power source 762 outputs first power PW1' to the output 710, the output sensing module 742 may determine the output of the first power source 762 according to a voltage variation DI1'. When the second power source 764 outputs second power PW2' to the output 710, the output sensing module 742 may determine the output of the second power source 764 according to a voltage variation DI2'.

The first voltage variation DI1' may be a voltage variation due to a connection between the output unit 710 and the first power source, and the second voltage variation DI2 may be a voltage variation due to a connection between the output unit 710 and the second power source.

The output sensing module 742 may sense the output of the first power source 762 and the second power source 764 and transmit a result of the sensing to the control module 746.

The selecting module 744 may receive selection information SEL from a power control device 750. The selecting module 744 may transmit the received selection information SEL to the control module 746.

The control module 746 may control the overall operation of the controller 740.

Upon sensing the input of an external device, the control module 746 may output a control signal CTRL based on the selection information SEL. The control module 746 may transmit the control signal CTRL to the demultiplexer 730.

The selection information SEL and the control signal CTRL are described below in greater detail with reference to FIGS. 11A and 11B.

Figures 11A, 11B, 12:
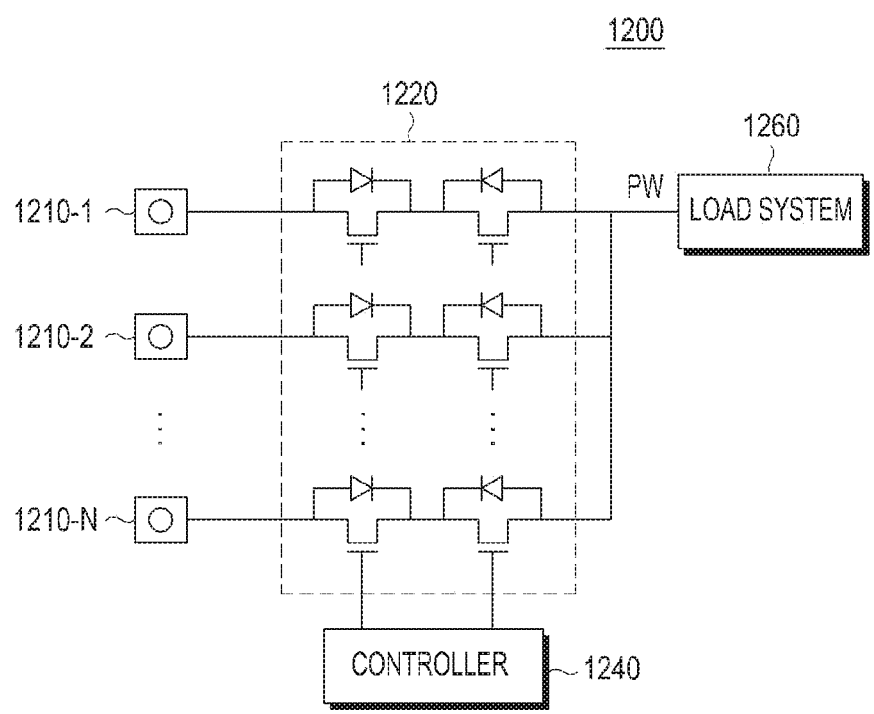
FIGS. 11A and 11B are tables illustrating selection information and control signals of an electronic device supplying power, according to an embodiment of the present disclosure.
FIG. 12 is a block diagram illustrating an electronic device receiving power, according to an embodiment of the present disclosure.

FIGS. 11A and 11B are tables illustrating selection information and control signals of an electronic device supplying power, according to an embodiment of the present disclosure.

When a selection information item SEL included in the selection information is a '1' the selection information may indicate the selection of the first power source 762 out of the first power source 762 and the second power source 764. The control module 746 may output a control signal CTRL to select the first power source 762 of the first power source 762 and the second power source 764.

Referring to FIG. 11B, the control module 746 may output a control signal CTRL corresponding to a '1' to select the first power source.

When the selection information item SEL included in the selection information is a '0' the selection information may indicate the selection of the second power source 764 out of the first power source 762 and the second power source 764. The control module 746 may output a control signal CTRL to select the second power source 764 of the first power source 762 and the second power source 764.

Referring to FIG. 11B, the control module 746 may output a control signal CTRL corresponding to a '0' to select the second power source.

According to an embodiment of the present disclosure, the control module 746 may transmit the control signal CTRL to the demultiplexer 730.

When the control signal CTRL is a '1' the demultiplexer 730 may output signals to control the first switching circuit (e.g., switch closed) and the second switching circuit (e.g., switch open) so that the first power source is connected with the output unit 710. When the control signal CTRL is a '0,' the demultiplexer 730 may output signals to control the first switching circuit (e.g., switch open) and the second switching circuit (e.g., switch closed) so that the second power source 764 is connected with the output unit 710.

The communication module 748 may communicate data with the power control device 750. The communication module 748 may communicate data with the power control device 750 through, e.g., an I2C, GPIO, and/or SMBus interface.

The control module 746 may transmit information PI' about the power source that is currently supplying power to the output unit 710 through the communication module 748.

The controller 740 may further include a source indicator that transmits the information PI' about the power source currently supplying power to the output unit 710. In this case, the source indicator may transmit the information PI' about the power source currently supplying power to the output unit 710 to the power control device 750.

FIG. 12 is a block diagram illustrating an electronic device receiving power, according to an embodiment of the present disclosure.

Referring to FIG. 12, an electronic device 1200 may be substantially the same or similar to the electronic device 500 described above in connection with FIG. 5.

The electronic device 1200 includes a plurality of power input units 1210-1 to 1210-N, where N is a positive integer not less than 2.

The plurality of power input units 1210-1 to 1210-N, respectively, may be connected with a plurality of power sources.

A switching unit 1220 may include a plurality of switching circuits. The plurality of switching circuits, respectively, may be connected with the plurality of power sources through the plurality of power input units 1210-1 to 1210-N.

According to an embodiment of the present disclosure, a controller 1240 may control the plurality of switching circuits so that the power source, corresponding to selection information, of the plurality of power sources is connected with a load system 1260. In other words, the controller 1240 may control the plurality of switching circuits to supply power PW from the power source, corresponding to the selection information, of the plurality of power sources to the load system 1260.

According to an embodiment of the present disclosure, the controller 1240 may control the plurality of switching circuits to change the power source connected with the load system 1260 to another power source of the plurality of power sources without cutting off the power PW supplied to the load system 1260.

Figure 13:
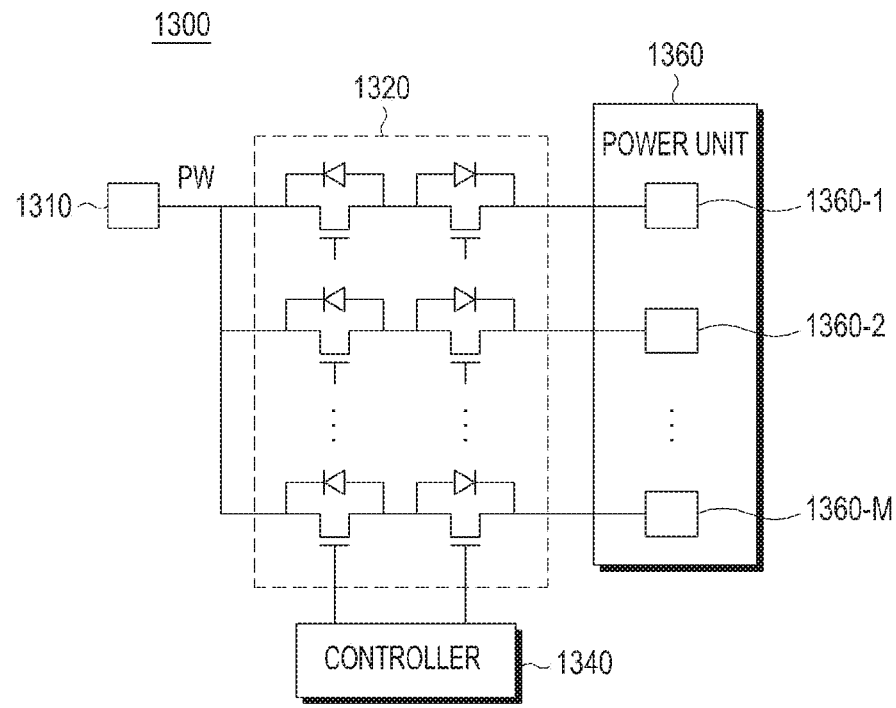
FIG. 13 is a block diagram illustrating an electronic device supplying power, according to an embodiment of the present disclosure.

FIG. 13 is a block diagram illustrating an electronic device supplying power, according to an embodiment of the present disclosure.

Referring to FIG. 13, an electronic device 1300 may be substantially the same as or similar to the electronic device 700 described above in connection with FIG. 7.

The electronic device 1300 includes a power unit 1360 including a plurality of power sources 1360-1 to 1360-M, where M is a positive integer not less than 2.

A switching unit 1320 may include a plurality of switching circuits. The plurality of switching circuits, respectively, may be connected with the plurality of power sources.

According to an embodiment of the present disclosure, a controller 1340 may control the plurality of switching circuits so that the power source, corresponding to selection information, of the plurality of power sources is connected with an output unit 1310. In other words, the controller 1340 may control the plurality of switching circuits to supply power PW from the power source, corresponding to the selection information, of the plurality of power sources to the output unit 1310.

According to an embodiment of the present disclosure, the controller 1340 may control the plurality of switching circuits to change the power source connected with the output unit 1310 to another power source of the plurality of power sources without cutting off the power PW supplied to the output unit 1310.

Figure 14A:
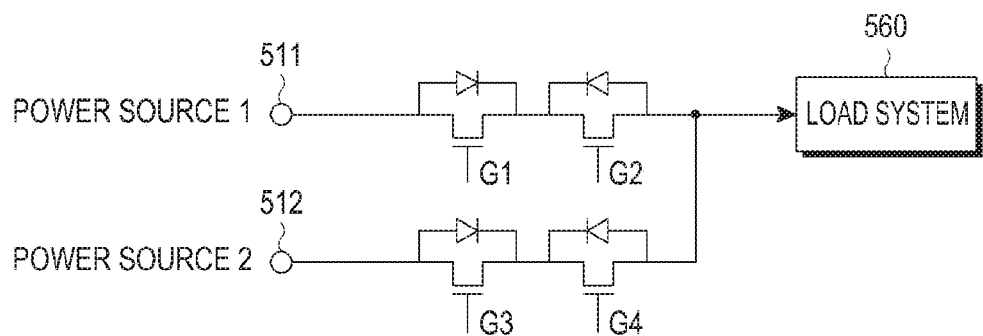
FIG. 14A is a block diagram illustrating an electronic device supplying power, according to an embodiment of the present disclosure.

FIG. 14A is a block diagram illustrating an electronic device supplying power, according to an embodiment of the present disclosure.

Figure 14B:
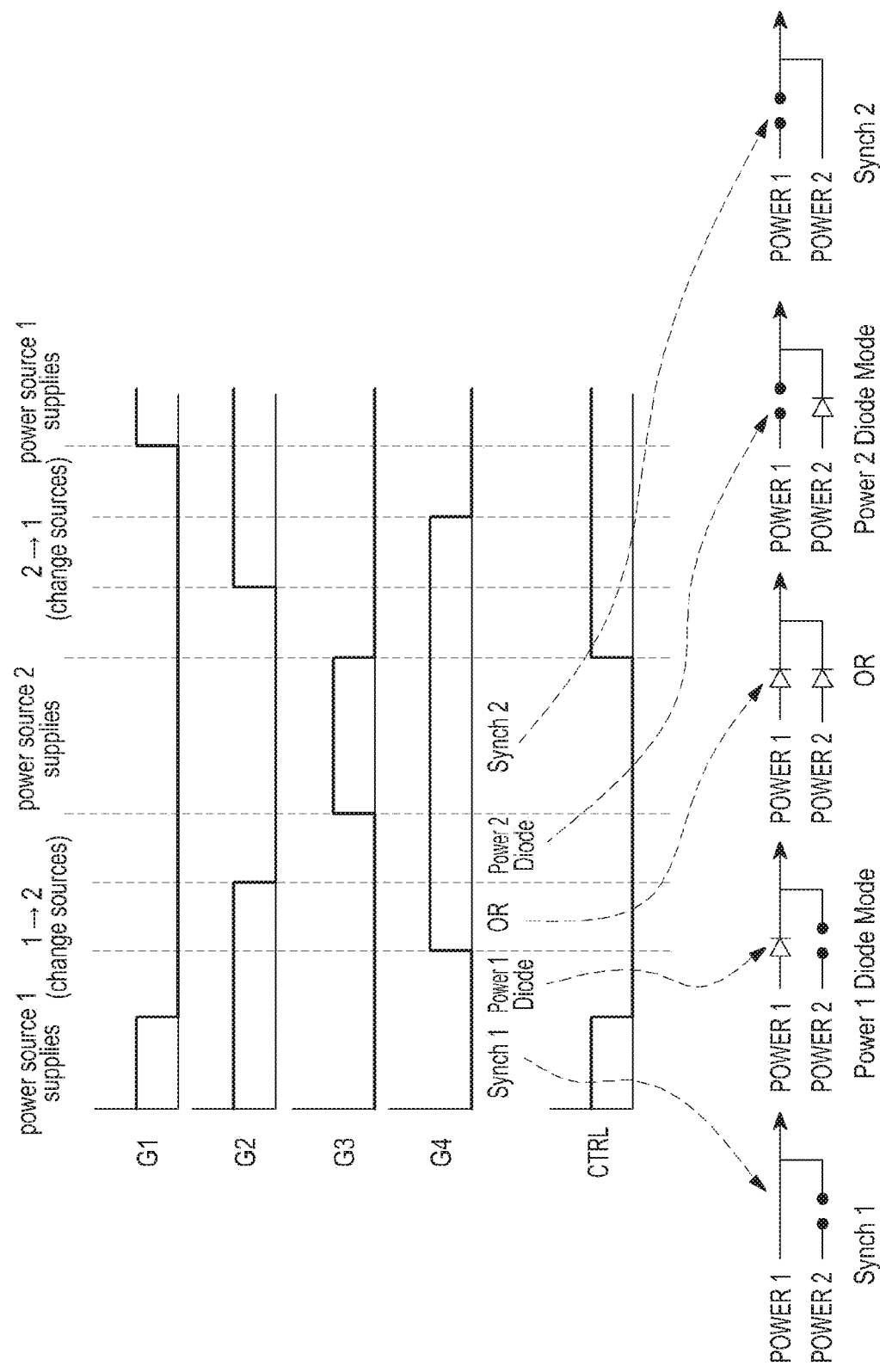
FIGS. 14B and 14C are timing charts illustrating the operation of controlling a switching unit by a controller, according to an embodiment of the present disclosure.
Figure 14C:
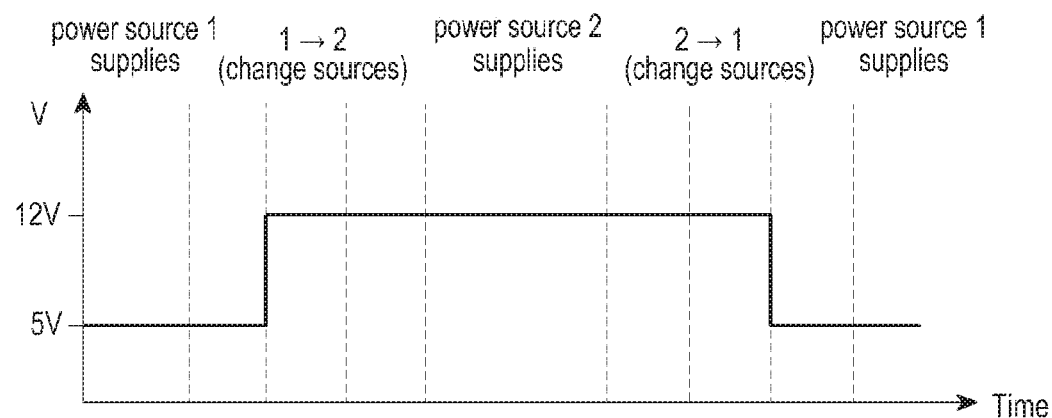

FIGS. 14B and 14C are timing charts illustrating the operation of controlling a switching unit by a controller, according to an embodiment of the present disclosure.

Referring to FIG. 14A, a first power source may be connected with a first switching circuit through a first power input unit 511. The first switching circuit may include a first switching element G1 and a second switching element G2.

A second power source may be connected with a second switching circuit through a second power input unit 512. The second switching circuit may include a third switching element G3 and a fourth switching element G4.

According to an embodiment of the present disclosure, a controller 540 may control the first switching circuit and the second switching circuit so that the first power source supplies power to a load system 560. The controller 540 may also change the power source supplying power to the load system 560 from the first power source to the second power source without cutting off the supply of power to the load system 560.

The first power source may have a 5V voltage, and the second power source may have a 12V voltage.

Referring to FIG. 14B, the operation of changing the power source supplying power to the load system 560 from the first power source to the second power source without cutting off the supply of power to the load system 560 may be implemented in five steps.

The first step may be in which the controller 540 supplies first power PW1 output from the first power source to the load system 560. The controller 540 may transmit a control signal CTRL corresponding to a '1' to a demultiplexer.

In the first step, the controller 540 may control the first switching circuit G1 and G2 and the second switching circuit G3 and G4 so that the first power source is connected to the load system 560. The controller 540 may close the first switching circuit by applying a voltage to the first switching element G1 and the second switching element G2. In contrast, the controller 540 may open the second switching circuit by removing a voltage to the third switching element G3 and the fourth switching element G4.

Referring to FIG. 14C, the load system 560 may receive the first power PW1 of 5V in the first step.

The second step may be a step for the controller 540 to supply second power PW2 output from the second power source to the load system 560. The controller 540 may transmit a control signal CTRL corresponding to a '0' to the demultiplexer.

In the second step, the controller 540 may control the first switching circuit G1 and G2 and the second switching circuit G3 and G4 to change the first power source connected with the load system 560 to the second power source. The controller 540 may change the equivalent circuit of the first switching circuit to a diode by applying a voltage to the second switching element G2, but not applying a voltage to the first switching element G1. In contrast, the controller 540 may open the second switching circuit by removing a voltage to the third switching element G3 and the fourth switching element G4. Accordingly, also in the second step, the controller 540 enables the first power PW1 output from the first power source to be supplied to the load system 560.

Referring to FIG. 14C, the load system 560 may receive the first power PW1 of 5V in the second step.

The third step may be a step for the controller 540 to supply second power PW2 output from the second power source to the load system 560. The controller 540 may transmit a control signal CTRL corresponding to a '0' to the demultiplexer.

In the third step, the controller 540 may control the first switching circuit G1 and G2 and the second switching circuit G3 and G4 to change the first power source connected with the load system 560 to the second power source. The controller 540 may change the equivalent circuit of the first switching circuit to a diode by applying a voltage to the second switching element G2, but not applying a voltage to the first switching element G1. The controller 540 may also change the equivalent circuit of the second switching circuit to a diode by applying a voltage to the fourth switching element G4, but not applying a voltage to the third switching element G3. Accordingly, in the third step, the controller 540 enables any one of the first power PW1 output from the first power source and the second power PW2 output from the second power source to be supplied to the load system 560.

The controller 540 enables the higher of the first power PW1 and the second power PW2 to be supplied to the load system 560.

Referring to FIG. 14C, the load system 560 may receive the second power PW2 of 12V in the third step.

The fourth step may be for the controller 540 to supply second power PW2 output from the second power source to the load system 560. The controller 540 may transmit a control signal CTRL corresponding to a '0' to the demultiplexer.

In the fourth step, the controller 540 may control the first switching circuit G1 and G2 and the second switching circuit G3 and G4 to change the first power source connected with the load system 560 to the second power source. The controller 540 may open the second switching circuit by removing a voltage to the first switching element G1 and the second switching element G2. The controller 540 may also change the equivalent circuit of the second switching circuit to a diode by applying a voltage to the fourth switching element G4 but not applying a voltage to the third switching element G3. Accordingly, in the fourth step, the controller 540 enables the second power PW2 output from the second power source to be supplied to the load system 560.

Referring to FIG. 14C, the load system 560 may receive the second power PW2 of 12V in the fourth step.

The fifth step may be in which the controller 540 supplies second power PW2 output from the second power source to the load system 560. The controller 540 may transmit a control signal CTRL corresponding to a '0' to the demultiplexer.

In the fifth step, the controller 540 may control the first switching circuit G1 and G2 and the second switching circuit G3 and G4 so that the second power source is connected to the load system 560. The controller 540 may open the first switching circuit by removing a voltage to the first switching element G1 and the second switching element G2. The controller 540 may also close the second switching circuit by applying a voltage to the third switching element G3 and the fourth switching element G4.

Referring to FIG. 14C, the load system 560 may receive the second power PW2 of 12V in the fifth step.

The controller 540 may change the power source supplying power to the load system 560 from the first power source to the second power source without cutting off the supply of power to the load system 560.

Although the operations in which the controller 540 changes the power source connected with the load system 560 from the first power source to the second power source are shown in FIGS. 14B and 14C, the present disclosure is not limited thereto. The operation of changing the second power source to the first power source may also be performed as set forth above, and the number of power sources is not limited thereto.

Figure 15A:
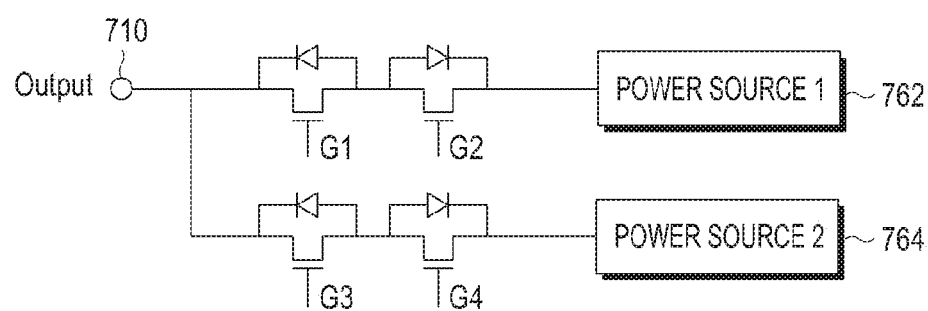
FIG. 15A is a block diagram illustrating an electronic device supplying power, according to an embodiment of the present disclosure.

FIG. 15A is a block diagram illustrating an electronic device supplying power, according to an embodiment of the present disclosure.

Figure 15B:
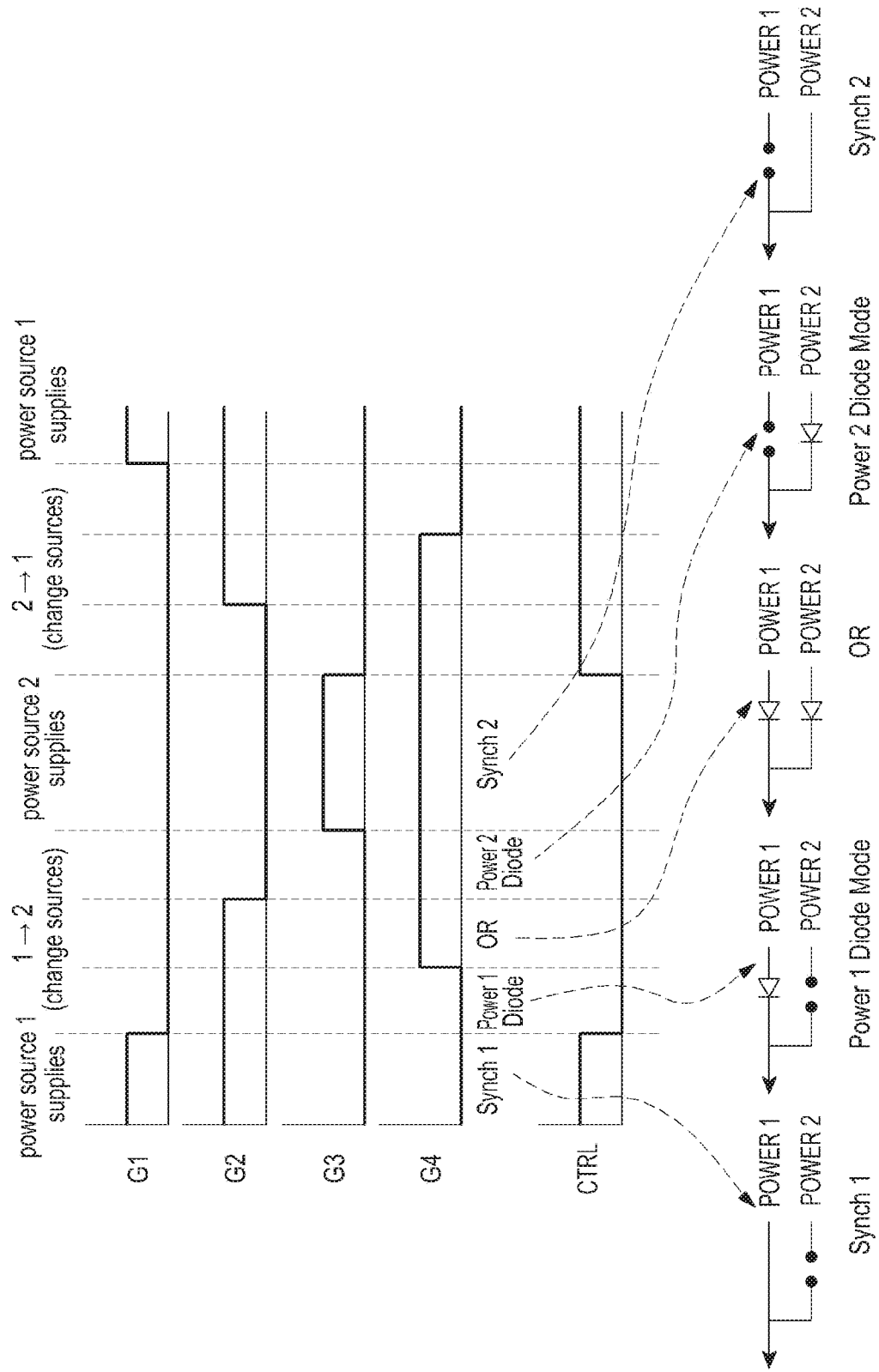
FIGS. 15B and 15C are timing charts illustrating the operation of controlling a switching unit by a controller, according to an embodiment of the present disclosure.
Figure 15C:
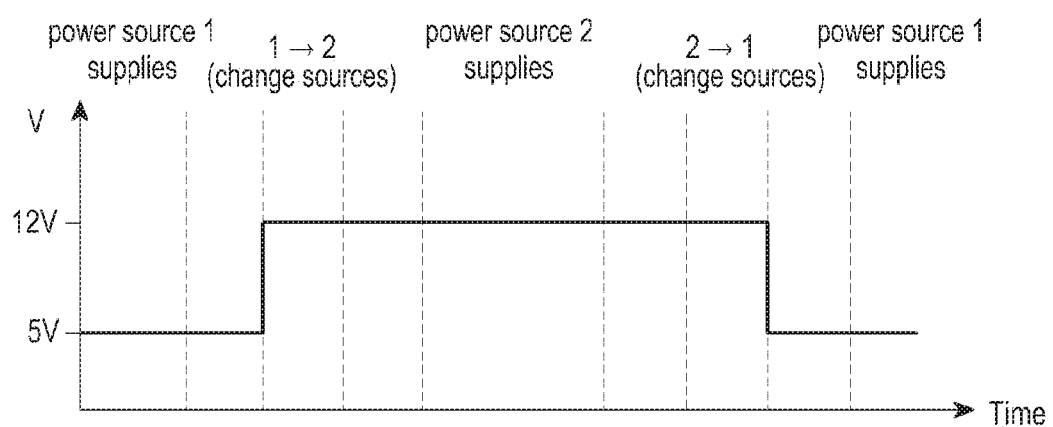

FIGS. 15B and 15C are timing charts illustrating the operation of controlling a switching unit by a controller, according to an embodiment of the present disclosure.

Referring to FIG. 15A, a first power source 762 may be connected to an output unit 710 through a first switching circuit. The first switching circuit may include a first switching element G1 and a second switching element G2.

A second power source 764 may be connected to the output unit 710 through a second switching circuit. The second switching circuit may include a third switching element G3 and a fourth switching element G4.

According to an embodiment of the present disclosure, a controller 740 may control the first switching circuit and the second switching circuit so that the first power source 762 supplies power to the output unit 710. The controller 740 may also change the power source supplying power to the output unit 710 from the first power source 762 to the second power source 764 without cutting off the supply of power to the output unit 710.

The first power source 762 may have a 5V voltage, and the second power source 764 may have a 12V voltage.

Referring to FIG. 15B, the operation of changing the power source supplying power to the output unit 710 from the first power source to the second power source without cutting off the supply of power to the output unit 710 may be implemented in five steps.

The first step may be in which the controller 740 supplies first power PW1' output from the first power source 742 to the output unit 710. The controller 740 may transmit a control signal CTRL corresponding to a '1' to the demultiplexer.

In the first step, the controller 740 may control the first switching circuit G1 and G2 and the second switching circuit G3 and G4 so that the first power source 742 is connected to the output unit 710. The controller 740 may close the first switching circuit by applying a voltage to the first switching element G1 and the second switching element G2. In contrast, the controller 740 may open the second switching circuit by removing a voltage to the third switching element G3 and the fourth switching element G4.

Referring to FIG. 15C, the output unit 710 may receive the first power PW1' of 5V in the first step.

The second step may be a step for the controller 740 to supply second power PW2' output from the second power source 764 to the output unit 710. The controller 740 may transmit a control signal CTRL corresponding to a '0' to the demultiplexer.

In the second step, the controller 740 may control the first switching circuit G1 and G2 and the second switching circuit G3 and G4 to change the first power source 762 connected with the output unit 710 to the second power source 764. The controller 740 may change the equivalent circuit of the first switching circuit to a diode by applying a voltage to the second switching element (G2) but not applying a voltage to the first switching element G1. In contrast, the controller 740 may open the second switching circuit by removing a voltage to the third switching element G3 and the fourth switching element G4. Accordingly, also in the second step, the controller 540 enables the first power PW1' output from the first power source 762 to be supplied to the output unit 710.

Referring to FIG. 15C, the output unit 710 may receive the first power PW1' of 5V in the second step.

The third step may be for the controller 740 to supply second power PW2' output from the second power source 764 to the output unit 710. The controller 740 may transmit a control signal CTRL corresponding to a '0' to the demultiplexer.

In the third step, the controller 740 may control the first switching circuit G1 and G2 and the second switching circuit G3 and G4 to change the first power source 762 connected with the output unit 710 to the second power source 764. The controller 740 may change the equivalent circuit of the first switching circuit to a diode by applying a voltage to the second switching element G2, but not applying a voltage to the first switching element G1. The controller 740 may also change the equivalent circuit of the second switching circuit to a diode by applying a voltage to the fourth switching element G4, but not applying a voltage to the third switching element G3. Accordingly, in the third step, the controller 740 enables any one of the first power PW1' output from the first power source 762 and the second power PW2' output from the second power source 764 to be supplied to the output unit 710. The controller 740 enables the power output having a higher voltage of the first power PW1' and the second power PW2' to be supplied to the output 710.

Referring to FIG. 15C, the output unit 710 may receive the second power PW2' of 12V in the third step.

The fourth step may be for the controller 740 to supply second power PW2' output from the second power source 764 to the output unit 710. The controller 740 may transmit a control signal CTRL corresponding to a '0' to the demultiplexer.

In the fourth step, the controller 740 may control the first switching circuit G1 and G2 and the second switching circuit G3 and G4 to change the first power source 762 connected with the output unit 710 to the second power source 764. The controller 740 may open the second switching circuit by removing a voltage to the first switching element G1 and the second switching element G2. The controller 740 may also change the equivalent circuit of the second switching circuit to a diode by applying a voltage to the fourth switching element G4, but not applying a voltage to the third switching element G3. Accordingly, in the fourth step, the controller 740 enables the second power PW2' output from the second power source to be supplied to the output unit 710.

Referring to FIG. 15C, the output unit 710 may receive the second power PW2' of 12V in the fourth step.

The fifth step may be a in which the controller 740 supplies second power PW2' output from the second power source 764 to the output unit 710. The controller 440 may transmit a control signal CTRL corresponding to a '0' to the demultiplexer.

In the fifth step, the controller 740 may control the first switching circuit G1 and G2 and the second switching circuit G3 and G4 so that the second power source 764 is connected to the output unit 710. The controller 740 may open the first switching circuit by removing a voltage to the first switching element G1 and the second switching element G2. The controller 740 may also close second switching circuit by applying a voltage to the third switching element G3 and the fourth switching element G4.

Referring to FIG. 15C, the output unit 710 may receive the second power PW2' of 12V in the fifth step.

The controller 740 may change the power source supplying power to the output unit 710 from the first power source 762 to the second power source 764 without cutting off the supply of power to the output unit 710.

Although the operations in which the controller 740 changes the power source connected with the output unit 710 from the first power source to the second power source are shown in FIGS. 15B and 15C, the present disclosure is not limited thereto. The operation of changing the second power source to the first power source may also be performed as set forth above, and the number of power sources is not limited thereto.

Figure 16:
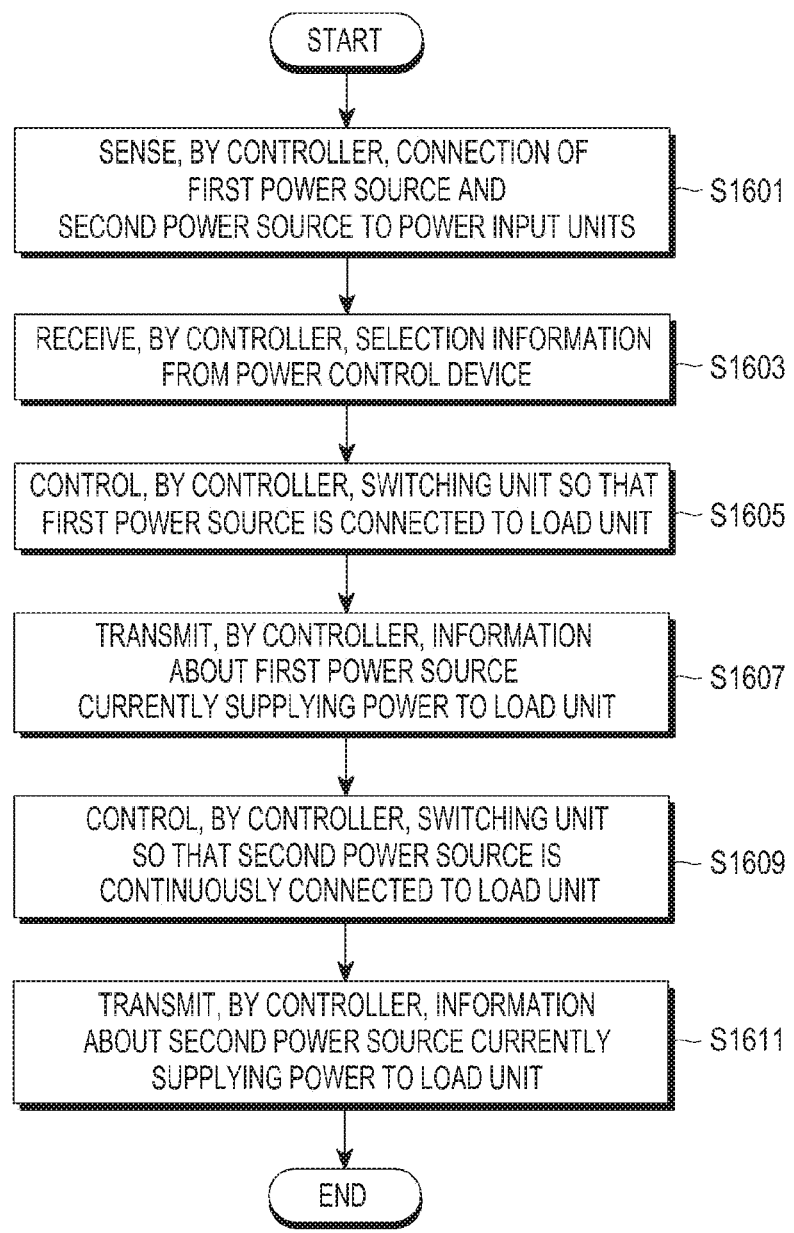
FIG. 16 is a flowchart illustrating a method of operating an electronic device, according to an embodiment of the present disclosure.

FIG. 16 is a flowchart illustrating a method of operating an electronic device, according to an embodiment of the present disclosure.

Referring to FIG. 16, a controller 540 senses connection of a first power source and a second power source to power input unit 510 in step S1601.

The controller 540 receives selection information SEL1 and SEL2 from a power control device 550 in step S1603. The controller 540 may receive the selection information SEL1 and SEL2 with the first power source and the second power source inputted to the power input unit 510.

The controller 540 controls a switching unit 520 so that the first power source is connected to a load system 560 in step S1605. The controller 540 may control the switching unit 520 so that first power PW1 output from the first power source is supplied to the load system 560.

The controller 540 transmits information PI regarding the first power source currently supplying power to the load system 560 to a power control device 550 in step S1607.

The controller 540 controls the switching unit 520 so that the second power source is continuously connected to the load system 560 without cutting off the power supplied to the load system 560 in step S1609. The controller 540 may change the power source connected to the load system 560 from the first power source to the second power source without cutting off the supply of power to the load system 560.

The controller 540 transmits the information PI regarding the second power source currently supplying power to the load system 560 to the power control device 550 in step S1611.

Figure 17:
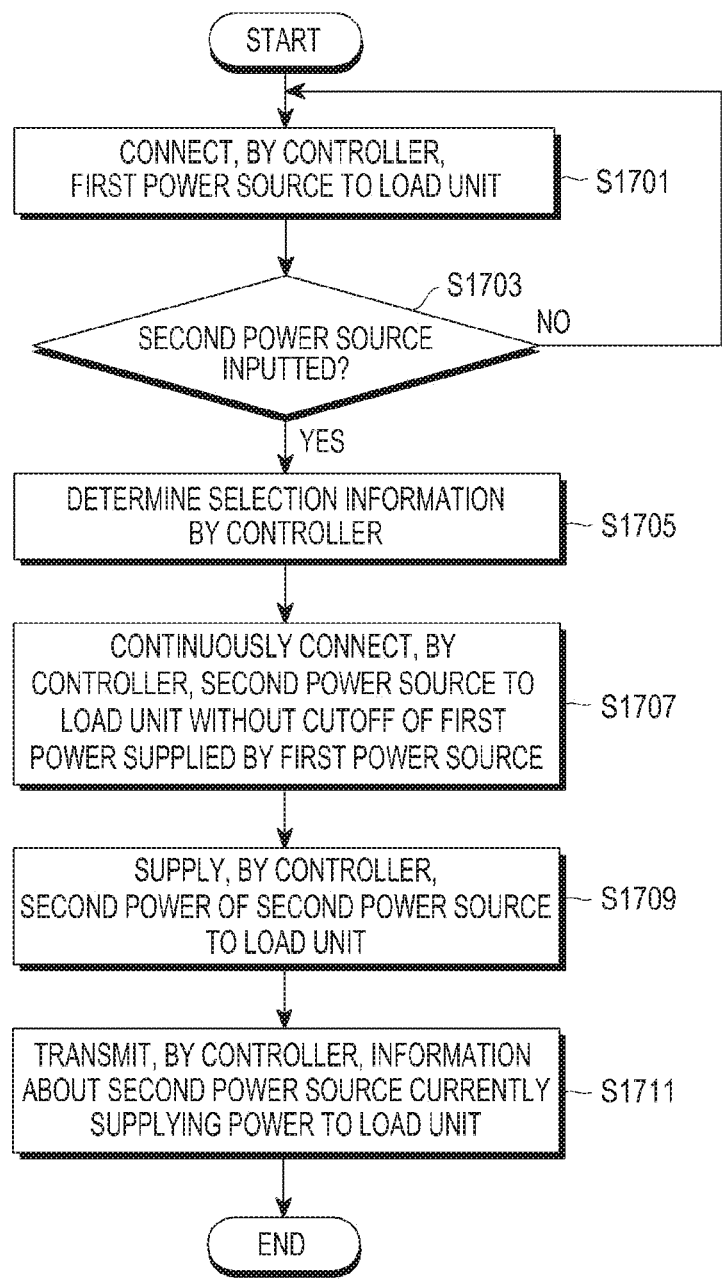
FIG. 17 is a flowchart illustrating a method of operating an electronic device, according to an embodiment of the present disclosure.

FIG. 17 is a flowchart illustrating a method of operating an electronic device, according to an embodiment of the present disclosure.

Referring to FIG. 17, the controller 540 controls the switching unit 520 so that the first power source is connected to the load system 560 in step S1701.

The controller 540 may determine whether the second power source, which is different from the first power source, is input to the power input unit 510 in step S1703.

Unless the second power source is input (no in step S1703), the controller 540 connects the first power source to the load system 560, and the load system 560 receives first power PW1 from the first power source.

When the second power source is input (yes in step S1703), the controller 540 receives selection information SEL1 and SEL2 from the power control device 560 in step S1705.

The controller 540 controls the switching unit 520 so that the second power source is connected to the load system 560 based on the selection information SEL1 and SEL2 while the first power PW1 supplied to the load system 560 is not cut off in step S1707.

The controller 540 controls the switching unit 520 so that the second power source supplies power PW2 to the load system 560 in step S1709.

The controller 540 transmits the information PI regarding the second power source currently supplying power to the load system 560 to the power control device 560 in step S1711.

Figure 18:
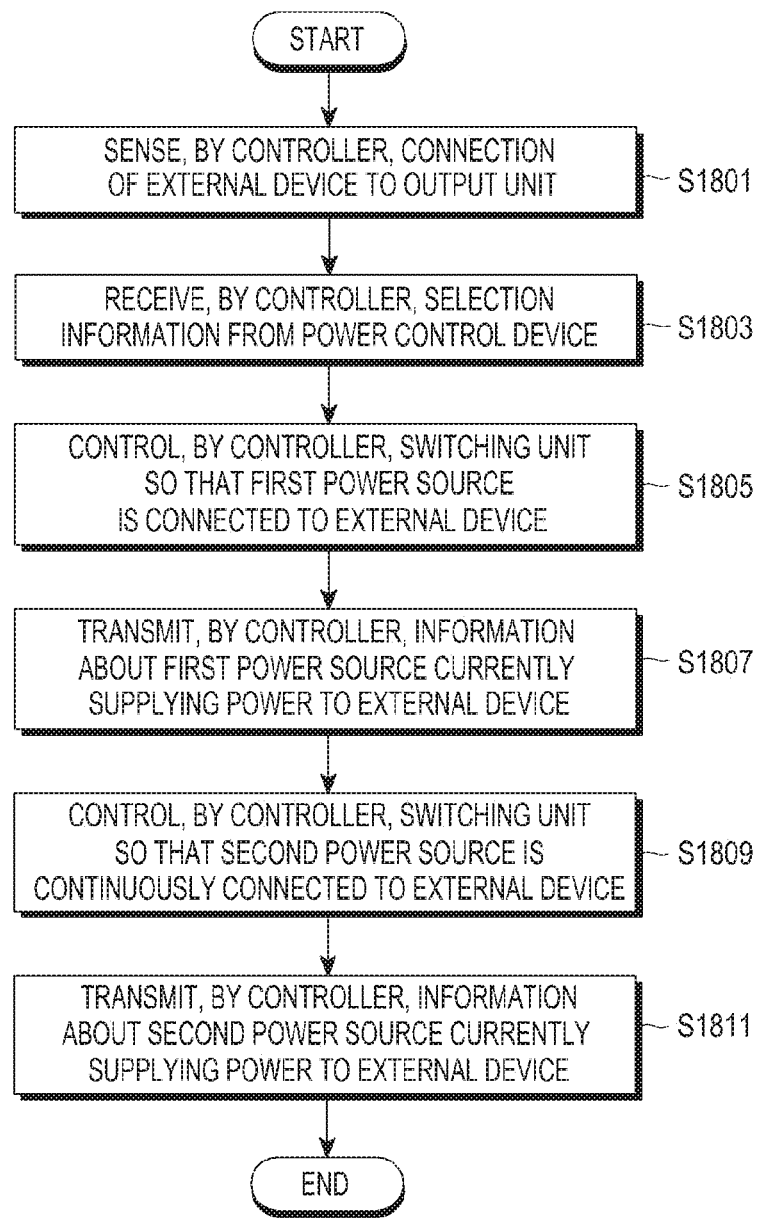
FIG. 18 is a flowchart illustrating a method of operating an electronic device, according to an embodiment of the present disclosure.

FIG. 18 is a flowchart illustrating a method of operating an electronic device, according to an embodiment of the present disclosure.

Referring to FIG. 18, the controller 740 senses an external device connected to the output unit 710 in step S1801.

The controller 740 receives selection information SEL from the power control device 750 in step S1803. The controller 740 may receive the selection information SEL with the external device connected to the output unit 710.

The controller 740 may control the switching unit 720 so that the first power source 762 included in the power unit 760 is connected to the external device in step S1805. The controller 740 may control the switching unit 720 so that first power PW1' output from the first power source 762 is supplied to the external device.

The controller 740 transmits information PI' regarding the first power source 762 currently supplying power to the external device to the power control device 750 in step S1807.

The controller 740 controls the switching unit 720 so that the second power source 764 is continuously connected to the external device (or the output unit 710) without cutting off the power supplied to the external device in step S1809. The controller 740 may change the power source connected to the external device (or the output unit 710) from the first power source 762 to the second power source 764 without cutting off the supply of power to the external device.

The controller 740 transmits the information PI' regarding the second power source currently supplying power to the external device to the power control device 750 in step S1811.

Figure 19:
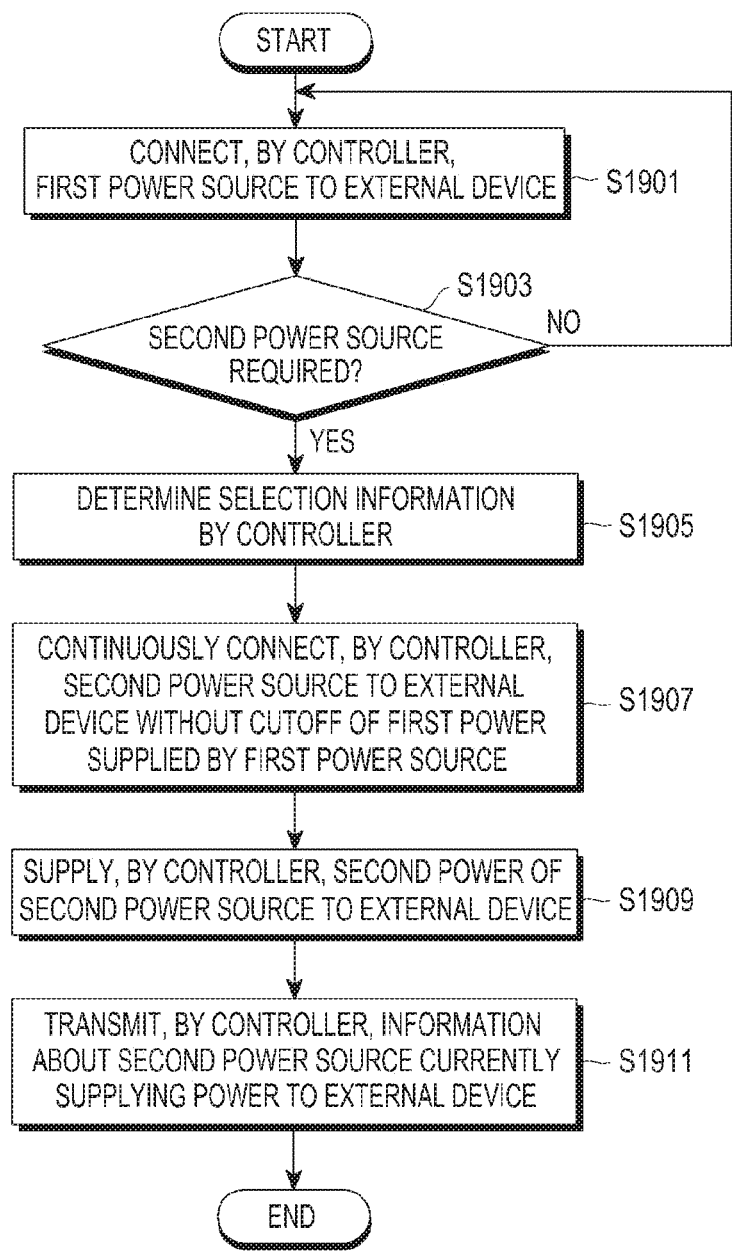
FIG. 19 is a flowchart illustrating a method of operating an electronic device, according to an embodiment of the present disclosure.

FIG. 19 is a flowchart illustrating a method for operating an electronic device according to an embodiment of the present disclosure.

Referring to FIG. 19, the controller 740 controls the switching unit 720 so that the first power source 762 is connected to the output unit 710 in step S1901.

The controller 740 determines whether the second power source 764, which is different from the first power source 762, is required in step S1903. If the second power source 764 is a more appropriate power source for the external device than the first power source 762, the controller 740 may determine that the second power source 764 is required. The controller may determine whether a power source is more appropriate for the external device based on, e.g., the magnitude of the voltage of the power source, a rated voltage of the external device, and/or the type of the power source.

If the second power source 764 is not required (no in step S1903), the controller 740 connects the output 710 with the first power source 762 so that the first power source 762 supplies first power PW1' to the external device.

If the second power source 764 is required (yes in step S1903), the controller 740 determines selection information SEL received from the power control device 750 in step S1905. The controller 740 may determine which one of the first power source 762 and the second power source 764 is to be connected with the output unit 710 based on the selection information SEL.

The controller 740 controls the switching unit 720 so that the second power source 764 is connected to the output unit 710 based on the selection information SEL without cutting off the first power PW1' supplied to the external device in step S1907.

The controller 740 controls the switching unit 720 so that the second power source 764 supplies the second power PW2' to the external device in step S1909.

The controller 740 transmits information PI' regarding the second power source 764 currently supplying power to the external device to the power control device 750 in step S1911.

According to an embodiment of the present disclosure, an electronic device includes a power input unit including a first power input unit and a second power input unit, a switching unit including a first switching circuit connected with the first power input unit and a second switching circuit connected with the second power input unit, and a controller configured to receive selection information for selecting a power source to supply power to a load unit included in the electronic device of a first power source and a second power source, wherein the first power source and the second power source are connected with the first power input unit and the second power input unit, respectively, and control the switching unit to connect the first power source to the load unit according to the selection information.

The controller is further configured to control the switching unit to change the first power source connected with the load unit to the second power source without cutting off first power output from the first power source supplied to the load unit.

The controller is further configured to control the switching unit so that second power output from the second power source is supplied without cutting off the first power supplied to the load unit.

The electronic device further includes a power control device. The controller is further configured to provide the power control device with information about which one of the first power source and the second power source supplies power to the load unit.

The controller is further configured to select the power source to supply the power to the load unit from the first power source and the second power source based on selection information received from the power control device.

When the selection information is information for selecting a last power source input from the first power source and the second power source, the controller is further configured to control the switching unit so that the last input power source supplies the power to the load unit.

When the selection information is information for selecting a power source first input from the first power source and the second power source, the controller is further configured to control the switching unit so that the first input power source supplies the power to the load unit.

When the selection information is information for selecting a power source from the first power source and the second power source, the controller is further configured to control the switching unit so that the selected power source supplies the power to the load unit.

The electronic device further includes a third power input unit and a third switching circuit connected with the third power input unit. When the third power source is connected with the third power input unit, the controller is further configured to control the switching unit to connect one of the first power source, the second power source, and the third power source to the load unit according to the selection information.

According to an embodiment of the present disclosure, a method of operating an electronic device includes sensing a connection of a first power source and a second power source to a first power input unit and a second power input unit, respectively, receiving selection information for selecting a power source to supply power to a load unit included in the electronic device from the first power source and the second power source, and controlling a switching unit to connect the first power source to the load unit according to the selection information.

The method further includes changing the first power source connected with the load unit to the second power source so that second power output from the second power source is supplied without cutting off first power output from the first power source supplied to the load unit.

The method further includes providing a power control device with information about which one of the first power source and the second power source supplies power to the load unit.

Selecting the first power source includes, when the selection information is information for selecting a last power source input of the first power source and the second power source, controlling the switching unit so that the last input power source supplies the power to the load unit.

Selecting the first power source includes, when the selection information is information for selecting a power source input first of the first power source and the second power source, controlling the switching unit so that the first input power source supplies the power to the load unit.

Selecting the first power source includes, when the selection information is information for selecting the first power source from the first power source and the second power source, controlling the switching unit so that the first power source supplies the power to the load unit.

According to an embodiment of the present disclosure, an electronic device includes an output unit connected with an external device, a power unit including a first power source and a second power source, a switching unit including a first switching circuit connected with the first power input unit and a second switching circuit connected with the second power input unit, and a controller configured to receive selection information for selecting a power source to supply power to the external device of the first power source and the second power source and control the switching unit to connect the first power source to the external device through the output unit according to the selection information.

The controller is further configured to control the switching unit to change the first power source connected with the external device to the second power source without cutting off first power output from the first power source supplied to the external device.

The controller is further configured to control the switching unit so that second power output from the second power source is supplied without cutting off the first power supplied to the external device.

The electronic device further includes a power control device. The controller is further configured to provide the power control device with information about which one of the first power source and the second power source supplies power to the external device.

The controller is further configured to select the power source to supply the power to the external device from the first power source and the second power source based on selection information received from the power control device.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

As is apparent from the foregoing description, according to an embodiment of the present disclosure, the electronic device, upon receiving power through the plurality of power sources, may select any one of the plurality of power sources and change the selected power source to another power source without cutting off the supply of power.

According to an embodiment of the present disclosure, the electronic device, upon supplying power through the plurality of power sources, may select any one of the plurality of power sources included in the electronic device and change the selected power source to another power source without cutting off the supply of power.

While the present disclosure has been particularly shown and described with reference to certain embodiments thereof, it will be understood by those of ordinary skill in the art that various changes in form and details may be made therein without departing from the spirit and scope of the present disclosure as defined by the appended claims and their equivalents.

What is claimed is:

1. An electronic device, comprising:
   a first power input unit and a second power input unit;
   a switching unit including a first switching circuit connected with the first power input unit and a second switching circuit connected with the second power input unit, wherein each of the first switching circuit and the second switching circuit includes at least one diode; and
   a controller configured to:
   identify a first power source and a second power source that are connected with the first power input unit and the second power input unit, respectively,
   in response to identifying that the first power source and the second power source are connected with the first power input unit and the second power input unit, obtain selection information for selecting one power source among the first power source and the second power source to supply power to a load unit included in the electronic device, and
   control the switching unit to connect the one power source among the first power source and the second power source to the load unit according to the selection information,
   wherein the controller is further configured to change the one power source connected to the load unit to another power source among the first power source and the second power source without cutting the power supplied to the load unit, using the at least one diode included in each of the first switching circuit and the second switching circuit,
   wherein, when the selection information is information for selecting a power source inputted later among the first power source and the second power source, the controller is further configured to control the switching unit so that the power source inputted later supplies power to the load unit, and
   wherein, when the selection information is information for selecting a power source inputted early among the first power source and the second power source, the controller is further configured to control the switching unit so that the power source inputted early supplies power to the load unit.

2. The electronic device of claim 1, wherein the controller is further configured to control the switching unit to change the first power source connected with the load unit to the second power source without cutting off first power output from the first power source supplied to the load unit.

3. The electronic device of claim 2, wherein the controller is further configured to control the switching unit to change the power supplied to the load unit from the first power source to second power output from the second power source without cutting off the first power source supplied to the load unit.

4. The electronic device of claim 1, further comprising a power control device, wherein the controller is further configured to provide the power control device with information about which one of the first power source and the second power source supplies power to the load unit.

5. The electronic device of claim 1, wherein the controller selects the one power source to supply power to the load unit from the first power source and the second power source based on the selection information.

6. The electronic device of claim 1, wherein, when the selection information is information for selecting a specific power source from the first power source and the second power source, the controller is further configured to control the switching unit so that the specific power source supplies power to the load unit.

7. The electronic device of claim 1, further comprising a third power input unit and a third switching circuit connected with the third power input unit, wherein when a third power source is connected with the third power input unit, the controller is further configured to control the switching unit to connect one of the first power source, the second power source, and the third power source to the load unit according to the selection information.

8. A method of operating an electronic device, the method comprising:
   sensing a connection of a first power source and a second power source to a first power input unit and a second power input unit, respectively;
   receiving selection information for selecting one power source to supply power to a load unit included in the electronic device from the first power source and the second power source;
   controlling a switching unit, which includes a first switching circuit connected with the first power input unit and a second switching circuit connected with the second power input unit and each of the first switching circuit and the second switching circuit includes at least one diode, to connect the one power source among the first power source and the second power source to supply power to the load unit according to the selection information; and
   changing the one power source connected to the load unit to another power source among the first power source and the second power source without cutting the power supplied to the load unit using the at least one diode included in each of the first switching circuit and the second switching circuit,
   wherein selecting the one power source includes, when the selection information is information for selecting a power source inputted later from the first power source and the second power source, controlling the switching unit so that the power source inputted later supplies power to the load unit.

9. The method of claim 8, further comprising changing the first power source connected with the load unit to the second power source so that second power output from the second power source is supplied without cutting off first power output from the first power source supplied to the load unit.

10. The method of claim 8, further comprising providing a power control device with information about which one of the first power source and the second power source supplies power to the load unit.

11. The method of claim 8, wherein selecting the one power source includes, when the selection information is information for selecting a power source input earlier from the first power source and the second power source, controlling the switching unit so that the first input power source inputted earlier supplies power to the load unit.

12. The method of claim 8, wherein selecting the first power source includes, when the selection information is information for selecting the first power source from the first power source and the second power source, controlling the switching unit so that the first power source supplies power to the load unit.

13. An electronic device, comprising:

an output unit configured to connect with an external device;

a power unit including a first power source and a second power source;

a switching unit including a first switching circuit connected with the first power input unit and a second switching circuit connected with the second power input unit, wherein each of the first switching circuit and the second switching circuit includes at least one diode; and a controller configured to:

obtain selection information for selecting one power source among the first power source and the second power source to supply power to the external device, and control the switching unit to connect the one power source among the first power source and the second power source to the external device through the output unit according to the selection information, wherein the controller is configured to change the one power source connected to the external device to another power source among the first power source and the second power source without cutting the power supplied to the external device, using the at least one diode included in each of the first switching circuit and the second switching circuit, wherein, when the selection information is information for selecting a power source inputted later among the first power source and the second power source, the controller is further configured to control the switching unit so that the power source inputted later supplies power to the external device, and wherein, when the selection information is information for selecting a power source inputted early among the first power source and the second power source, the controller is further configured to control the switching unit so that the power source inputted early supplies power to the external device.

14. The electronic device of claim 13, wherein the controller is further configured to control the switching unit to change the first power source connected with the external device to the second power source without cutting off first power output from the first power source supplied to the external device.

15. The electronic device of claim 14, wherein the controller is further configured to control the switching unit to change the power supplied to the external device from the first power source to second power output from the second power source without cutting off the first power supplied to the external device.

16. The electronic device of claim 13, wherein the controller is further configured to provide information about which one of the first power source and the second power source supplies power to the external device.

17. The electronic device of claim 13, wherein the controller is further configured to select the power source to supply power to the external device from the first power source and the second power source based on the selection information.

* * * * *